United States Patent [19]
Klang

[11] Patent Number: 5,589,757
[45] Date of Patent: *Dec. 31, 1996

[54] APPARATUS AND METHOD FOR STEP-CHARGING BATTERIES TO OPTIMIZE CHARGE ACCEPTANCE

[75] Inventor: James K. Klang, Rosemount, Minn.

[73] Assignee: GNB Battery Technologies, Inc., Mendota Heights, Minn.

[*] Notice: The term of this patent shall not extend beyond the expiration date of Pat. No. 5,583,416.

[21] Appl. No.: 480,828

[22] Filed: Jun. 7, 1995

Related U.S. Application Data

[63] Continuation-in-part of Ser. No. 188,957, Jan. 26, 1994.

[51] Int. Cl.$^6$ ............... H02J 7/04; H01M 10/44
[52] U.S. Cl. ............... 320/22; 320/32
[58] Field of Search ............... 320/22, 23, 24, 320/30, 31, 32, 39

[56] References Cited

U.S. PATENT DOCUMENTS

| | | |
|---|---|---|
| 3,421,067 | 1/1969 | Wilson et al. . |
| 3,424,969 | 1/1969 | Barry . |
| 3,517,293 | 6/1970 | Burkett et al. . |
| 3,517,295 | 6/1970 | Lapuyade . |
| 3,609,503 | 9/1971 | Burkett et al. . |
| 3,758,839 | 9/1973 | Medlar . |
| 3,816,806 | 6/1974 | Mas . |
| 3,816,807 | 6/1974 | Taylor . |
| 3,864,617 | 2/1975 | Smith et al. ............... 320/23 |
| 3,936,718 | 2/1976 | Melling et al. ............... 320/20 |
| 4,131,841 | 12/1978 | Bennefeld . |
| 4,146,830 | 3/1979 | Foster ............... 320/23 |
| 4,191,916 | 3/1980 | Zasio et al. . |
| 4,220,905 | 9/1980 | Quarton . |
| 4,270,080 | 5/1981 | Kostecki . |
| 4,354,148 | 10/1982 | Tada et al. ............... 320/20 |
| 4,388,582 | 6/1983 | Saar et al. . |
| 4,396,880 | 8/1983 | Windebank ............... 320/21 |
| 4,503,378 | 3/1985 | Jones et al. . |
| 4,549,127 | 10/1985 | Taylor et al. ............... 320/21 |
| 4,629,965 | 12/1986 | Fallon et al. . |
| 4,668,901 | 5/1987 | Furukawa . |
| 4,710,694 | 12/1987 | Sutphin et al. . |
| 4,740,739 | 4/1988 | Quammen et al. . |
| 4,742,290 | 5/1988 | Sutphin et al. . |
| 4,745,349 | 5/1988 | Palanisamy et al. . |
| 4,829,225 | 5/1989 | Podrazhansky et al. . |
| 4,956,597 | 9/1990 | Heavey et al. . |
| 5,013,992 | 5/1991 | Eavenson et al. . |
| 5,049,803 | 9/1991 | Palanisamy . |
| 5,049,804 | 9/1991 | Hutchings . |
| 5,140,252 | 8/1992 | Kizu et al. ............... 320/39 |
| 5,160,880 | 11/1992 | Palanisamy . |
| 5,166,623 | 11/1992 | Ganio . |
| 5,172,044 | 12/1992 | Sasaki et al. . |
| 5,179,335 | 1/1993 | Nor . |
| 5,192,905 | 3/1993 | Karlin et al. . |
| 5,198,743 | 3/1993 | McClure et al. . |
| 5,202,617 | 4/1993 | Nor . |
| 5,204,611 | 4/1993 | Nor et al. . |
| 5,206,578 | 4/1993 | Nor . |
| 5,206,579 | 4/1993 | Kawate et al. . |
| 5,233,284 | 8/1993 | Mattsson . |
| 5,307,000 | 4/1994 | Podrazhansky et al. . |
| 5,329,218 | 7/1994 | Rydborn ............... 320/21 |
| 5,367,244 | 11/1994 | Rose et al. ............... 320/23 |

*Primary Examiner*—Robert Nappi
*Assistant Examiner*—Patrick B. Law
*Attorney, Agent, or Firm*—Leydig, Voit & Mayer, Ltd.

[57] ABSTRACT

Apparatus and method for charging a battery, wherein a charging voltage is applied to a battery. The charging voltage depends on a base charging voltage which is continually adjusted in the direction that provides a more optimal level of charge acceptance. The direction of a more optimal charge acceptance is determined by adjusting the charging voltage in steps of predetermined magnitudes such that the steps provide an upper pair and a lower pair of spaced-apart charging levels. The current at each stepped voltage is measured, and used to calculate first and second current differentials corresponding to the upper and lower pairs. The base charging level is incremented or decremented to adjust the base charging level in the direction that provided the smaller differential. As the process is repeated, the charging level continually moves closer to a charging voltage level that minimizes the differential thereby providing a more optimal charge acceptance.

45 Claims, 19 Drawing Sheets

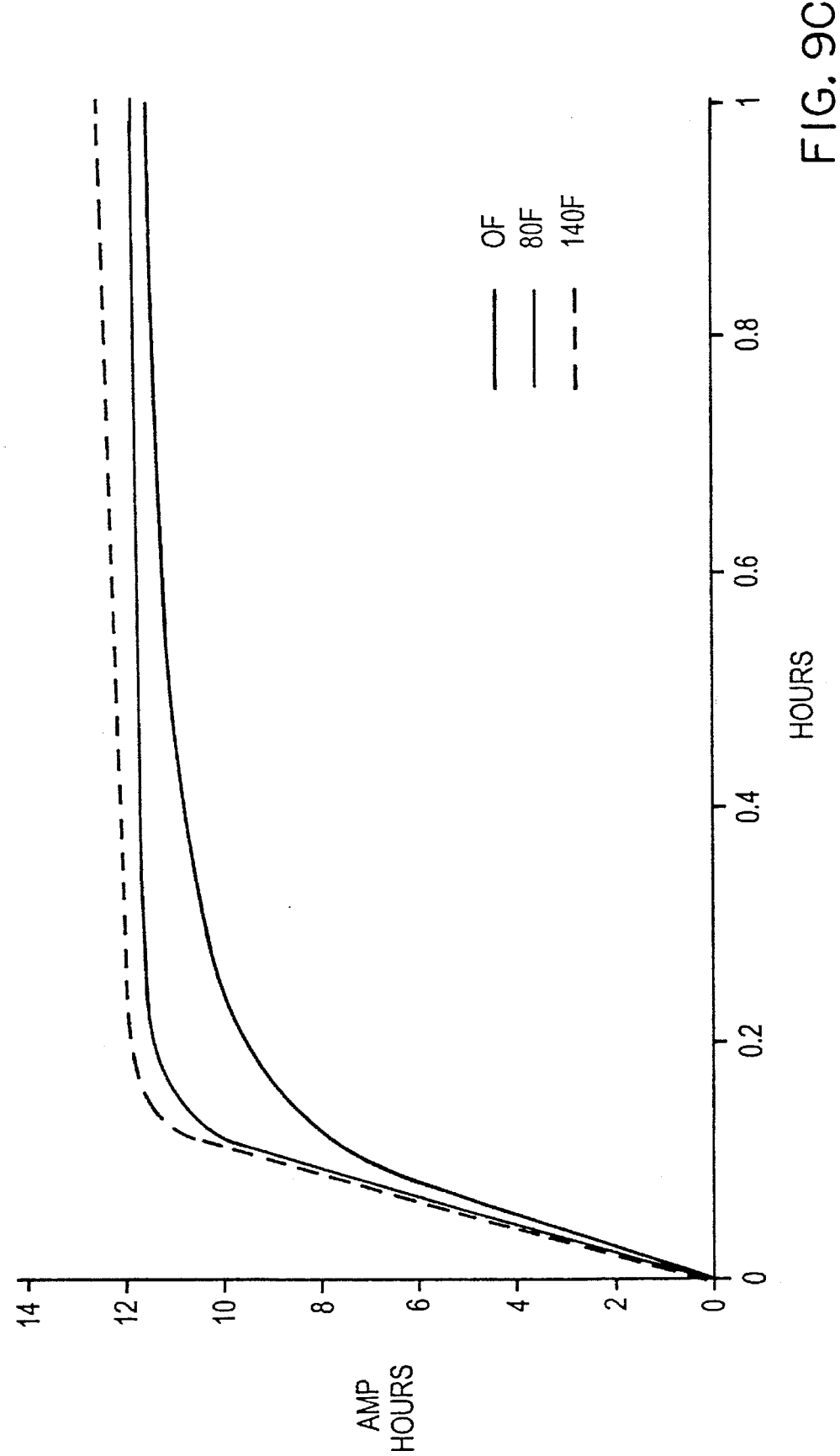

APPARATUS AND METHOD FOR STEP-CHARGING BATTERIES TO OPTIMIZE CHARGE ACCEPTANCE

This application is a continuation-in-part of copending U.S. patent application Ser. No. 08/188,957 filed Jan. 26, 1994.

FIELD OF THE INVENTION

The invention relates generally to the field of batteries, and more particularly to an apparatus and method for rapidly and efficiently charging batteries.

BACKGROUND OF THE INVENTION

Rechargeable batteries are increasingly becoming an important source of clean portable power in a wide variety of electrical applications, including use in automobiles, boats and electric vehicles. In particular, the lead-acid battery, while an old technology, continues to constitute a substantial portion of the rechargeable batteries being produced. While not particularly energy efficient because of the inherent weight of lead with respect to other metals, lead-acid batteries still retain the advantage of being very power efficient while being among the cheapest, most reliable and most readily producible rechargeable batteries. Thus, lead-acid batteries are typically used to start engines, propel vehicles such as golf carts, and to act as non-interruptable sources of back-up power when an external supply of electricity is interrupted.

The ability of the lead-acid battery to deliver large amounts of electrical power is well known, particularly when associated with the starting of motor vehicles. Likewise, the need to recharge these batteries and the problems associated therewith are also well known.

Many limitations and faults found in lead-acid batteries and other types of batteries are the result of poor recharging control. For example, overcharging of a battery wastes energy, reduces the product life, and may permanently damage the battery. In addition, overcharging can accelerate grid corrosion, increase the specific gravity of the electrolyte by dissociating water into its component gasses, and generate undue heat that tends to amplify and accelerate other problems.

On the other hand, undercharging the battery limits its capacity and likewise leads to degradation of the battery that is often unrecoverable. Undercharging is known to cause stratification of the electrolyte (particularly in flooded batteries), uneven use of the active materials, and may even lead to permanent sulfation of the active materials.

As defined in a reference text entitled "Lead-Acid Batteries," by Hans Bode, (copyright 1977 by J. Wiley and Sons), the capability of a cell or battery to store the charging current so that it can be redischarged is called the charge acceptance. The charge efficiency is defined as the current input actually charging the battery divided by the total input current. Thus, the current flowing into a battery is either used to charge the battery, i.e., the charge acceptance, or must be dissipated, which primarily occurs in side chemical reactions such as gassing. Thus, an idealized instantaneous charge acceptance of a battery at any point in its recharge is a charging current at which all of the available soluble discharge product, i.e., lead sulfate ($PbSO_4$) for a lead-acid battery, is being charged without undue gas generation. In other words, it is the maximum amount of charging input current that can flow into the battery while still maintaining an acceptable amount of gas generation. Note that since the amount of gas generation that is acceptable to a particular application varies depending on a number of user-determined factors, there is no actual ideal charge current, only a current that most efficiently charges the battery while maintaining an acceptable or desirable amount of gas generation.

To recharge a battery in accordance with its optimized charging requirements ordinarily requires consideration of a large number of factors and compensation therefor. For example, a number of factors such as the intended use of the battery, its age and history, and in particular the resistance and internal temperature of the battery, influence charging requirements. Other factors that are ordinarily considered include the type of battery (such as maintenance free or user maintained), the size of the battery, the rate and amount of discharge, the stand time of the battery since discharge, composition of the battery and the presence or absence of chemical species or impurities that may affect gassing or hinder the solubility of lead sulfate. Finally, safety must always be considered since fire, fuming, explosion, or thermal runaway may occur as a result of uncontrolled excessive overcharging.

In addition, consideration must be given to whether the charging apparatus is intended to be a stand-alone unit or must be capable of functioning in a vehicle charging apparatus. More particularly, in a vehicle, the charging may be taking place alternatively as the battery may be called on to deliver power under a wide range of circumstances.

As a result of these and other potential charging considerations, the methods of charging lead-acid (and other) batteries have traditionally fallen into two primary categories. The first category consists of a constant current apparatus and method which applies an arbitrarily low current to a discharged battery until it is fully recharged, typically taking ten-to-twenty hours. The current value is purposely set low so that it will not harm the battery at the end of the charging period. Particularly when dealing with flooded batteries, this charging technique is frequently supplemented with an excess of charge which destratifies the electrolyte with gasses produced from the electrolysis of water.

However, in addition to taking a considerable amount of time to recharge, if the level of discharge prior to recharging is not initially known, the time and amount of current necessary to properly recharge the battery will be difficult to establish and the battery must therefore be monitored to prevent undercharge or excess overcharge. Numerous prior techniques have attempted to measure the point at which to terminate this type of time-inefficient charging, but all suffer from the same inherent problem, i.e., having constant current charging does not match the variable battery charge acceptance requirements throughout the recharging process.

The second category of charging methods and apparatuses are those which are based on a constant or fixed voltage output. Chargers having this capability are usually set to a maximum initial current output, which remains at that level until the voltage of the battery rises to that of the charger, whereby the current tapers gradually to a low end value. A full charge is indicated by a low, steady current. These chargers are typically left on until the battery is needed for use or when a maximum time limit has been reached.

Because of the low amount of current at the end of the charging cycle and the low overcharge at typically conservative recharge voltages, with this type of apparatus a deeply discharged flooded battery often will have a stratified electrolyte even when full recharge is obtained, limiting battery performance and life. Increasing the voltage level in order to achieve more gassing or agitation and mixing is dangerous and difficult to accomplish without severely overcharging the battery if applied for too long of a period of time and possibly leads to thermal runaway. Other problems that arise with this type of charger include high battery temperatures and impurities that significantly influence the amount of charging current flowing to the battery at a fixed voltage. Accordingly, numerous techniques have been developed for constant voltage chargers that attempt to determine temperature compensation and the point of termination of charge, but again fail to match the optimal charge acceptance needs at any given moment.

Hybrid combinations of both of these charging methods with various timing mechanisms still suffer from the basic limitations imposed by these types of chargers, that is, they arbitrarily set the parameters for battery charging which restricts the conditions under which they work. In other words, the charging mechanism, not the battery itself, dictates the amount of charge supplied.

As a result of these and other well-known charger control problems, long periods of recharge at low rates of charging, known as trickle charging, have historically been used for lead-acid batteries, and are still common. However, with this recharging method the battery is tied up for long periods of time, thus greatly reducing the amount of time available for utilizing the battery. This is particularly unacceptable in applications where short recharge times are almost essential, such as with battery-based electric vehicles.

The need for a high rate of recharge is therefore paramount to efficient battery use in many applications. However, applying relatively high recharge currents, even for short periods of time, must be very carefully controlled, or will lead to excessive gassing, electrolyte spewing and increased heating that are both dangerous and can cause permanent battery damage and reduced life.

Most recently, microprocessor-based systems have been employed to control recharging techniques in various attempts at adjusting battery chargers to the changing conditions of the battery during charging. To function, however, these systems require extensive data calculations and suppositions for many battery conditions. For example, probing cycles are regularly made by such systems during charging in order to calculate a more ideal current or voltage charging level. However, these probing cycles (to determine improvements to charging conditions) tend to be lengthy in order to obtain useful data and are normally performed at a less-than-optimal charge. Thus, such systems cannot achieve the level of control required on the instantaneous basis that is required during high rates of charging. Moreover, frequent probing cycles can even lead to reduced control and efficiency.

The ability of a charging technique that inherently compensates and adjusts for such factors as the type of battery, temperature, previous discharge rate, stand time, state of charge and other such factors will lead to a very efficient battery charger and improved battery life. In spite of numerous prior attempts to determine an optimized electrical charging output required to match the charge acceptance needs of a recharging battery, no simple, reliable, rapid, and safe way to provide a variable recharging signal as dictated by the charge acceptance of the battery throughout the charging cycle is currently available.

Accordingly, it is a primary object of the present invention to provide a method and apparatus for charging a battery that regularly adjusts its electrical charging output to approach a more optimized level of charge acceptance of the battery.

It is a related object to provide a battery charger that inherently compensates for factors influencing charge acceptance requirements.

Another object of the invention is to provide a simple and efficient method and apparatus for charging a battery that automatically adjusts to determine an optimized recharging current and voltage profile for the battery based on the requirements of that specific battery and the output capacity of the charger.

An additional object is to provide a battery charger that is capable of efficiently and safely charging batteries of various types and sizes while controlling the amount of gassing.

Still another object is to provide a simple and reliable battery charger that can be combined with other charging techniques for handling diverse conditions and controlling the phases of a charging operation.

SUMMARY OF THE INVENTION

Briefly, the present invention provides a method and apparatus for charging batteries including a controllable power source providing an electrical charging output at variable current or voltage levels. The battery is connected at the power source to its terminals. The charger includes control circuitry that continually adjusts a base charging voltage or current, upon which the electrical charging output to the battery depends, in the direction of a more optimal charge acceptance.

To determine the direction of a more optimal charge acceptance, the control circuitry adjusts the charging output to the battery in steps of predetermined magnitudes such that the steps provide an upper pair and a lower pair of spaced-apart charging levels. A sensor measures the charge input to the battery at each of the charging levels and provides values representative thereof.

The control circuitry calculates a first differential from the difference in the charge input values measured at the charging levels providing the upper pair, and a second differential from the difference in the charge input values measured at the charging levels providing the lower pair. The first and second differentials, which indicate the direction of more optimal charge acceptance, are compared with one another, and the base charging level is then incremented or decremented in accordance with the comparison. For example, when charging with voltages a smaller current differential indicates a more optimal charge acceptance, and thus the control circuitry adjusts the base charging voltage in the direction that provided the smaller current differential. As the process is repeated, the charging level is thus continually moved closer to a level that provides a more optimal charge acceptance (e.g., by minimizing the difference between the current differentials when charging with voltage or by maximizing the difference between the voltage differentials when charging with current), until the battery is determined to be sufficiently charged as described in more detail below.

Other objects and advantages will become apparent from the following detailed description when taken in conjunction with drawings, in which:

Figure 1:
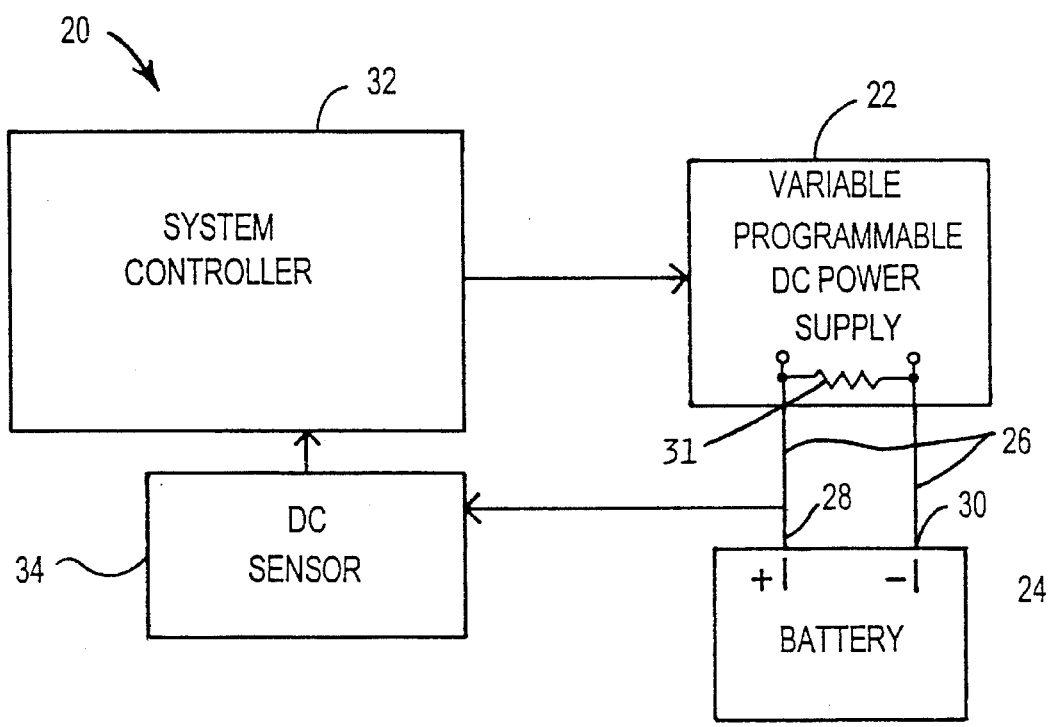
FIG. 1 is a block diagram of a generalized battery charging system embodying the present invention.

While the invention is susceptible to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

The present invention is directed to a battery charging apparatus that continually and repeatedly adjusts a base charging output (preferably a voltage) to track a more optimal charging level, in order to compensate for the varying charge acceptance of the battery throughout the charging process. To accomplish this, the charging apparatus and method periodically probe the battery by stepping the charging output a predetermined amount to various charging levels that depend on the most-recent base charging level. The stepped levels provide an upper pair and a lower pair of spaced-apart charging levels. The charge input (preferably a current) to the battery at each of the stepped charging levels is measured and used to calculate a lower differential from the difference in the charge input values measured at the charging levels providing the lower pair, and an upper differential from the difference in the charge input values measured at the charging levels providing the upper pair. When charging with voltages, the smaller of the lower and upper current differentials indicates the direction of more optimal charge acceptance, whereby the base charging voltage is adjusted in the appropriate direction. As the process is repeated, the charging voltage is thus continually moved closer to the level that minimizes the current differential.

Referring first to FIG. 1, there is shown a block diagram of a battery charging apparatus, or system, generally designated 20, according to the present invention, including a variable output power supply 22 connected in a conventional manner to a battery 24 for charging. To this end, the charging system 20 includes conductors 26 as a means for connecting the power source to charging terminals 28, 30 of the battery. Depending on the amount of charge to be conveyed therethrough, the conductors 26 may comprise heavy-gauge copper wires or cabling. The power supply 22 may include an optional internal or external resistor 31. If present, resistor 31 is preferably selected to have a value such that only a small amount of current is drawn with respect to the output capabilities of the power supply 22, e.g., the resistor draws approximately 1 to 2 amperes with a power supply capable of outputting 100 amperes.

Central to the charging system 20 is a system controller 32 having control circuitry therein for regulating the output of the power supply 22. Accordingly, the current and/or voltage supplied by the power supply 22 is ultimately determined at the system controller 32. A DC sensor 34 measures the charging input to the battery and returns at least one value to the system controller 32 indicative thereof. Typically the returned values represent the current flowing into the battery and/or the voltage across its terminals 28, 30.

Figure 2:
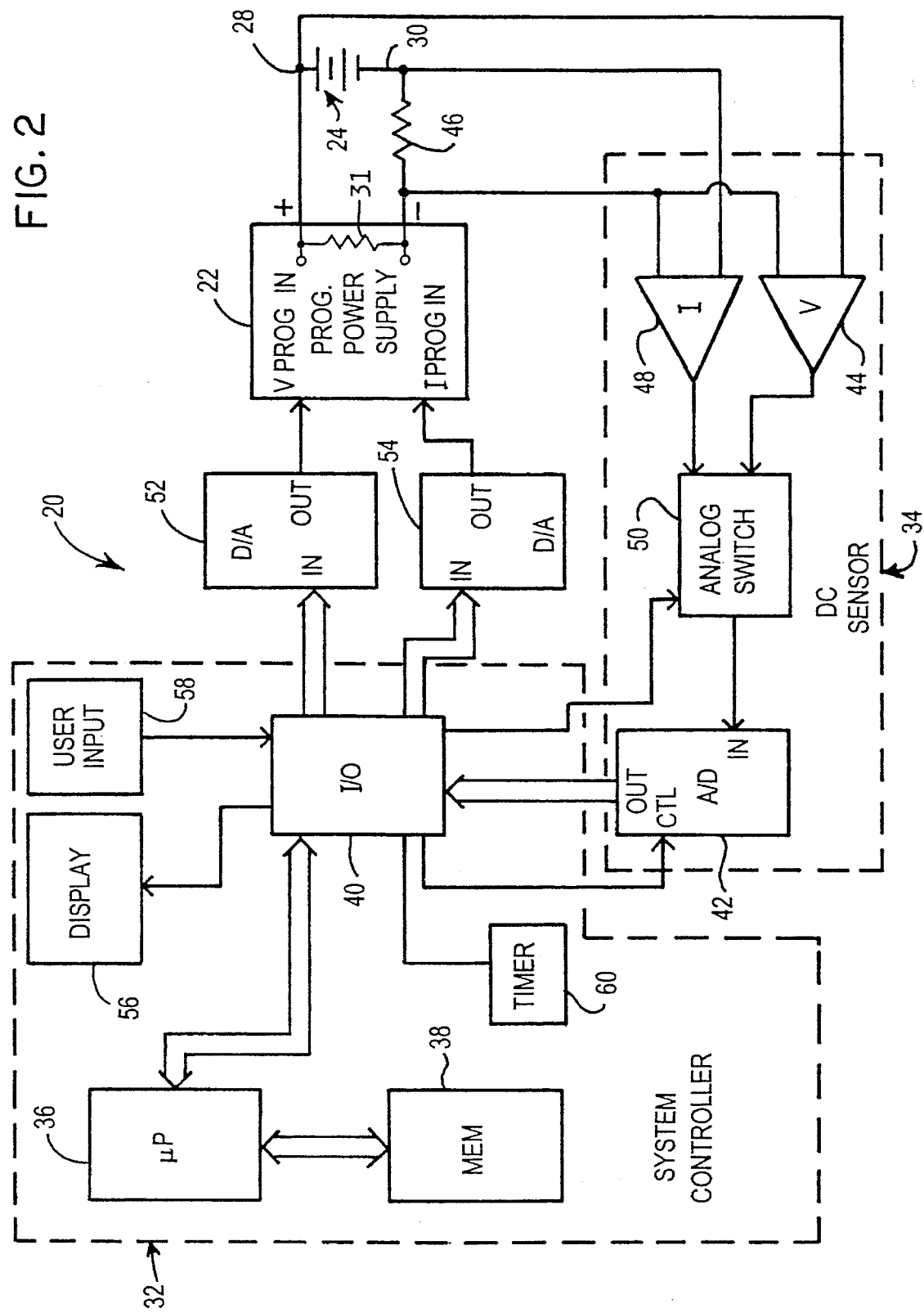
FIG. 2 is a block diagram of a more detailed apparatus for charging a battery according to the invention.

Preferably, as shown in more detail in FIG. 2, the system controller 32 includes a microprocessor 36, a memory 38, and input/output (I/O) circuitry 40 connected in a conventional manner. The memory 38 is intended to include random access memory (RAM), read-only memory (ROM) and the like. Conventional circuitry for latching output signals from the microprocessor 36 is ordinarily included in the I/O circuitry 40 where appropriate.

The power supply 22 is of a type capable of providing an electrical charging output at either a variable voltage level or a variable current level (or both) in accordance with commands received from the system controller 32. The commands controlling the power supply output may be in the form of digital signals, in which case digital-to-analog voltage conversion or its equivalent must take place. To this end, the charging apparatus 20 includes digital-to-analog voltage converters 52, 54. Accordingly, analog control voltages are provided thereby to control the power supply 22 via digital values output by the microprocessor 36.

It can be readily appreciated that although most programmable power supplies are configured to interpret such analog voltage levels, typically 0 to 5 volts, in order to set their voltage and current outputs the digital-to-analog voltage converters 52, 54 may be internal to the power supply 22, thus requiring a direct digital input thereto. In either case, the voltage and current to be applied to the battery are controlled by commands ultimately originating in the microprocessor 36. For example, the microprocessor will generally set the current to the maximum capability of the power supply and then control the voltage. Of course, for certain batteries where a maximum charging current level is known, for safety reasons the current is limited so as to be less than or equal to this maximum level. Thus, any suitable controllable power supply with fast response times to commands and a stable output, and having the desired voltage and current output capabilities (as dictated by the requirements of the battery to be charged, the time allowed, and the desired cost and electrical requirements of the power supply) will suffice for purposes of the invention. Switching power supplies are preferred, however SCR type supplies may also be adapted.

For reading the values indicative of the charging input, an analog-to-digital voltage converter 42 is provided. The analog-to-digital voltage converter 42 is selected so as to be sensitive and fast enough to measure anticipated changes in the charging output at the various steps. The voltage is read across the battery terminals 28, 30 and is attenuated by voltage attenuator 44 so as to match the input range of the analog-to-digital voltage converter 42 with the applied battery charging voltage. In addition, an offset voltage may be factored in such that the lowest reasonable voltage level in the battery charging voltage range corresponds to a certain (floor) level at the input of the analog-to-digital voltage converter 42. For example, an analog-no-digital voltage converter 42 having a 0–10 volt input voltage range would use its full range over an 8 to 20 volt charging level if first 8 volts was subtracted from the charging voltage, (via an operational amplifier configured as an adder circuit or the like, not shown), and the level was attenuated by a factor of 83.33%, (i.e., $10/12$). Of course, with lower-voltage batteries that are charged with less than the maximum analog-todigital voltage converter input voltage, the voltage can alternatively be amplified (rather than attenuated) for this purpose.

Similarly, the current flow into the battery, directly indicative of the charging input thereto, is read across a shunt resistor 46 and is ordinarily amplified by a current amplifier 48 (actually a differential voltage amplifier) so as to match the input range of the analog-to-digital voltage converter 42. An analog switch 50, under the control of the microprocessor 36 is provided so that a single analog-to-digital voltage converter 42 obtains both current and voltage measurements.

The preferred system controller 32 includes the analog-to-digital voltage converter 42 therein for converting the current and voltage measurements supplied by the DC sensor 32 to digital values. One integrated circuit, a Zilog Z86C30 microcontroller has been identified as being particularly useful as a component within the system controller 32, as it provides a microprocessor, RAM, ROM, and timer/counter capabilities in a single package. In addition, the Z86C30 has analog-to-digital voltage conversion capabilities by way of analog voltage comparators therein, provided a known variable reference voltage (for example, a voltage ramped at a known rate between a lower and upper limit) is made available for comparing against the input voltage.

Nevertheless, it can be readily appreciated that any number of equivalent system controllers can be developed from other digital and analog circuitry components to perform the desired control functions as described in more detail below. Indeed, one such charging apparatus 20 has been implemented comprising a 386DX20 personal computer as the system controller 32 executing instructions originally written in the BASIC programming language (for example, Microsoft QuickBASIC version 4.5), to control a Hewlett-Packard HP6031A programmable switching power supply via an IEEE488 interface bus (GPIB). However, while not necessary to the invention, it can be readily appreciated that it is ordinarily preferable to employ dedicated circuitry as the system controller 32 and power supply 22 for use in more commercial applications such as in vehicle-based charging systems or stand-alone battery charging devices.

According to the invention, the system controller 32 executes a software routine that continually attempts to adjust the charging output of the power supply 22 to track a more optimal charge acceptance of the battery. As described in more detail below, the preferred charger accomplishes this by continually adjusting its output voltage, via small discrete steps, in the direction that corresponds to an improved level of charge acceptance.

Although the power supply 22 may be configured as a variable voltage source or alternatively as a variable current source, unless otherwise noted, for simplicity herein the power supply 22 will be described as a variable output voltage source having its voltage output level controlled by the system controller 32, with its current output set to a level so as to provide sufficient current to the selected battery to achieve recharge in a desired time period. Moreover, while the invention is primarily described with respect to the charging of lead-acid batteries, there is no intention to limit the invention to any particular type of battery. On the contrary, the invention is specifically intended to be used with all types of batteries capable of accepting an external charge, including, but not limited to, all types of lead-acid type batteries, nickel-cadmium batteries, and alkaline batteries. Indeed, this general technique has been found to successfully recharge nickel-cadmium batteries.

Although not necessary to the invention, if desired, the system 20 may first check for an open or high resistance battery or other unusual condition such as an improper battery-to-charger connection before attempting the charging procedure. To this end, well-established techniques may be added to the software routine to be executed as part of an initialization procedure. If further desired, the system controller 32 may generate a warning signal, alarm or the like indicating a fault condition. Depending on the application, a display 56 or the like may be operatively connected to the I/O circuitry 40 to provide visual information. Moreover, a software routine to discharge the battery a predetermined amount before commencing the charging process may be further incorporated, which has been found useful with certain battery technologies such as nickel-cadmium batteries to eliminate memory effects.

For example, an initialization routine may include steps such as initializing a timer 60, establishing a maximum current level setting for the power supply, and/or obtaining the battery's open circuit voltage. Other preparation techniques may also be performed at this time. In addition, any user-set charging variables, such as establishing a maximum safe voltage or current level, may be input from a user input device 58 such as a keyboard or switchboard during this initialization procedure.

Figure 3A:
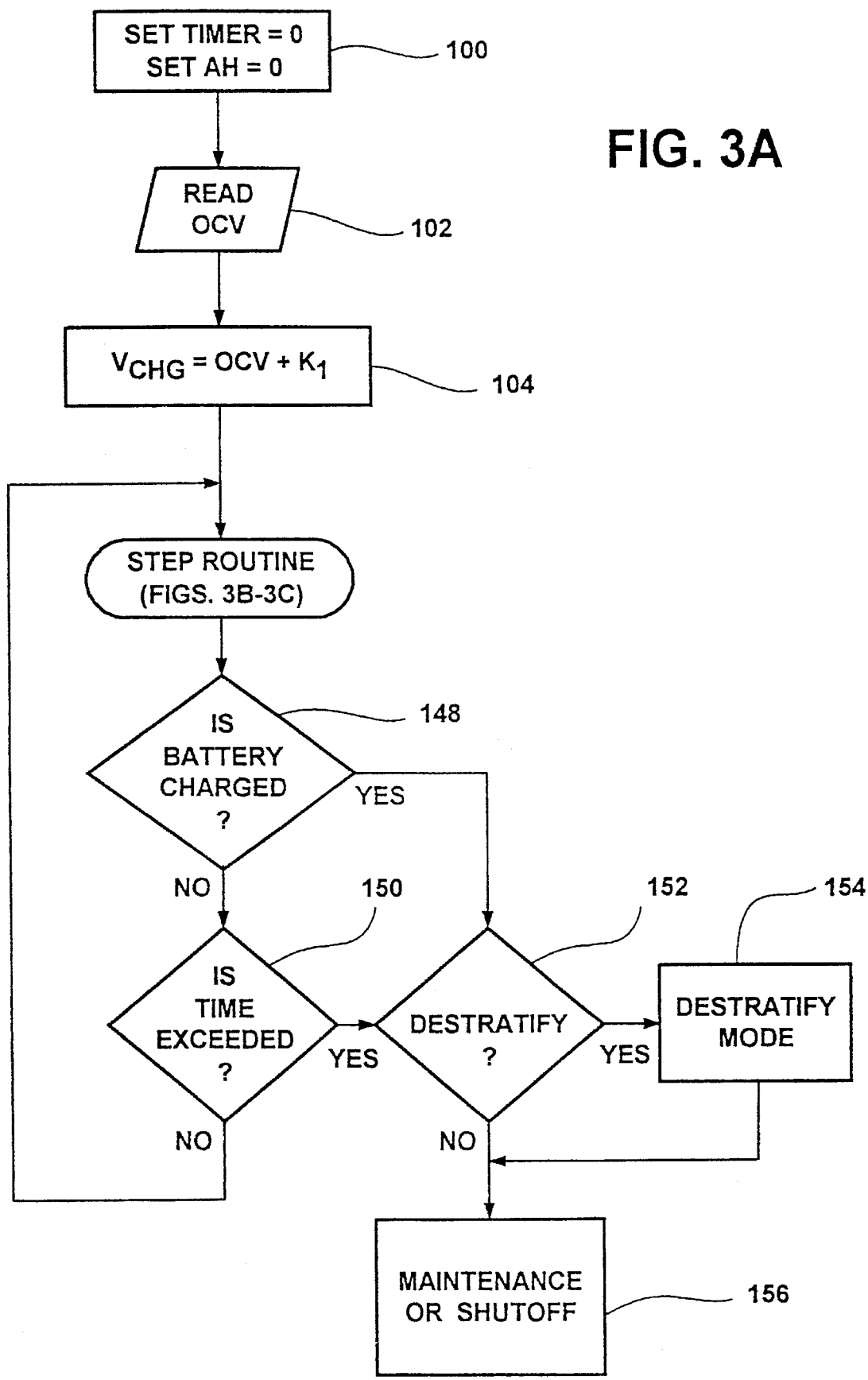
FIGS. 3A–3C comprise a flowchart representing the steps involved in charging the battery according to the present invention.
Figure 3B:
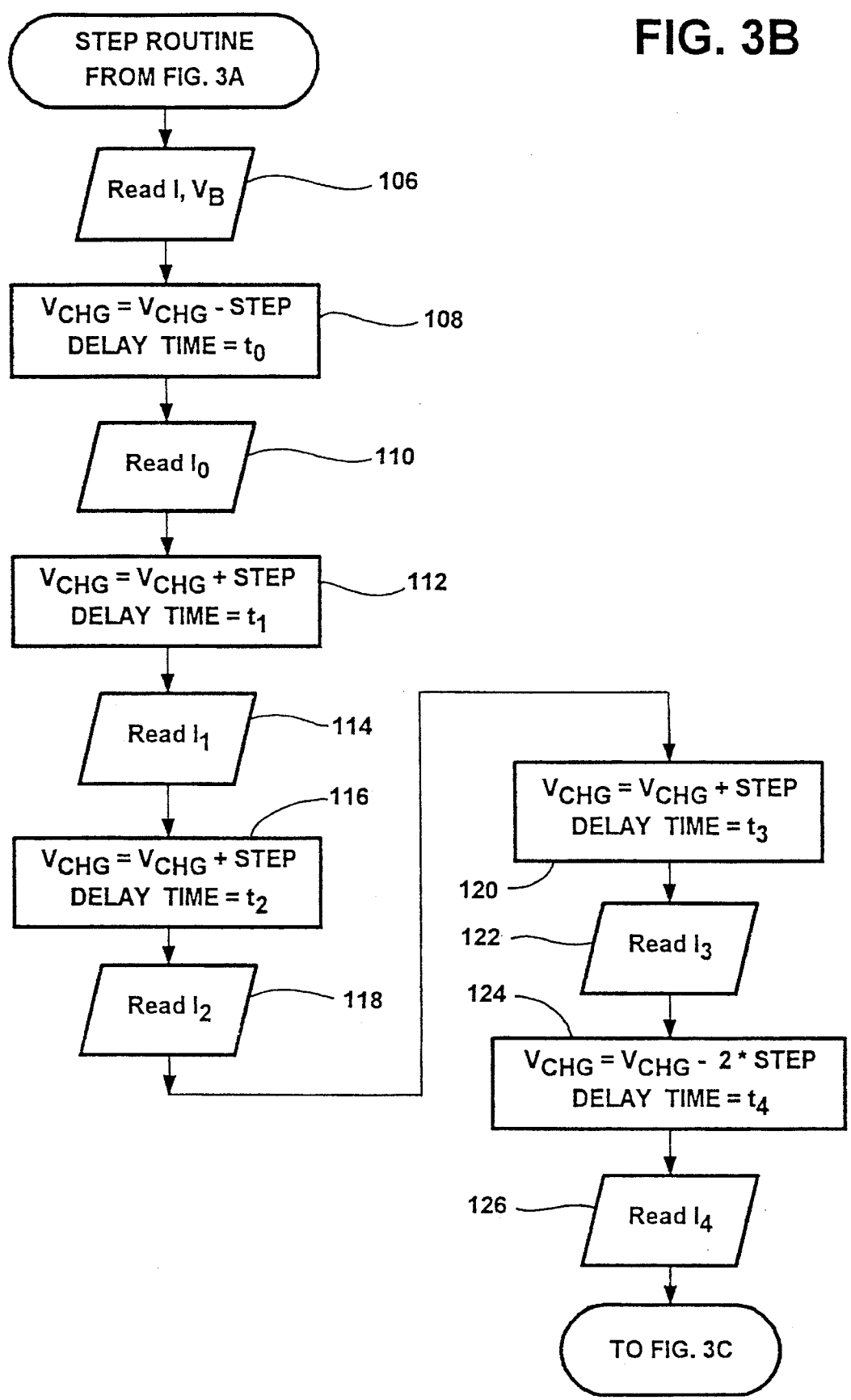
Figure 3C:
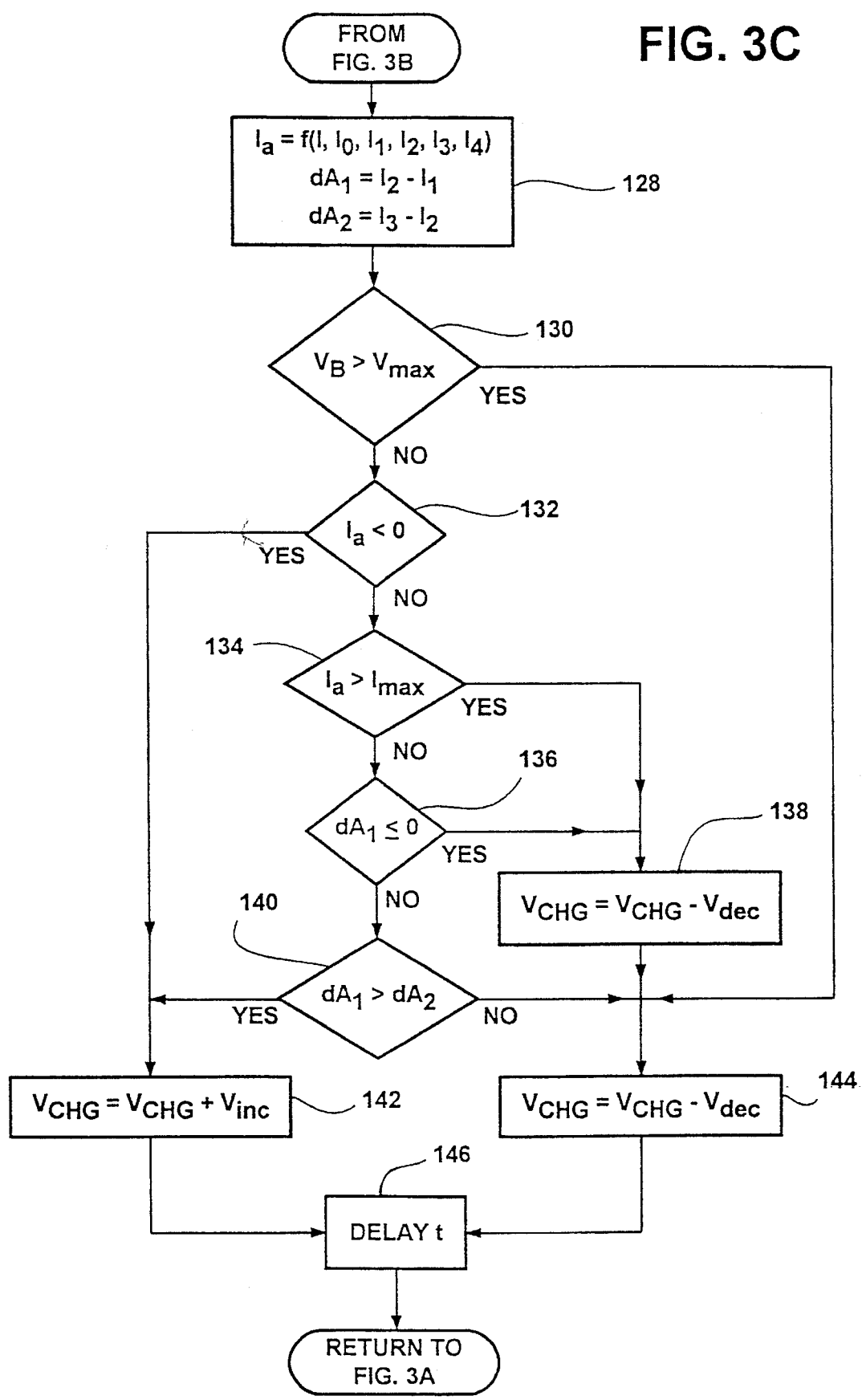

As represented in the flowchart of FIGS. 3A–3C, the exemplified charging routine begins with such an initialization routine including steps 100 to 104. In step 100, the microprocessor resets the timer 60 in the system controller 32 to zero. This may be done in any number of ways, for example by reading a real time clock value and using this time value as the zero point, or by resetting a dedicated counter. Additionally, a variable AH, indicative of the battery recharge in ampere-hours, is zeroed.

The charging system begins to charge the battery when the system controller 32 directs the variable power supply 22 to initially apply an electrical charging output to the battery 24. Thus, at step 104, the battery open circuit voltage (OCV) is read by controlling the analog switch 50 such that the analog-to-digital voltage converter 42 receives the voltage across the battery terminals, and then triggering the analog-to-digital voltage converter 42 to obtain a reading. As previously discussed, this voltage is ordinarily attenuated such that the analog-to-digital voltage converter 42 generally uses its full range to read the various charging voltages. Once obtained, an initial charging voltage, $V_{CHG}$, is established as the OCV plus a constant $K_1$.

The constant $K_1$ may be chosen as merely a desirable guess so as to initially start the charger at a voltage level that is reasonably close to the voltage level that the software routine will eventually move the charger output towards, regardless of the starting level. Indeed, no specific starting voltage level is necessary, (as long as reasonable), and thus $K_1$ may be zero, or even negative. The initial charging output may be chosen as an arbitrarily fixed potential typical of other fixed voltage chargers or charging regulators, e.g., fourteen to sixteen volts for a twelve-volt battery. For example, for a battery having an OCV of 12 volts, the initial charging voltage may be initially set to 14 volts by having $K_1$ equal 2 volts. Of course, $V_{CHG}$ may simply be set to a desired level at step 104 regardless of the OCV.

However, a preferable alternative is to desirably select a value of $K_1$ based upon the relative state of discharge of the battery, so that K1 is estimated in a manner that provides an initial charging voltage that is closer to an optimal charging voltage for the battery at that initial point in time. This may be accomplished by temporarily setting a charging output voltage to the maximum allowed by the battery for a short time duration, e.g., one or two seconds. At the end of that time, the initial inrush current is measured and used to determine $K_1$. If the initial inrush current is high, then the depth of discharge of the battery is relatively high, and thus the initial charging voltage $V_{CHG}$ as determined by $K_1$ is preferably a higher value. Conversely, if the initial inrush current is low, then the depth of discharge of the battery is relatively slight, and thus the initial charging voltage $V_{CHG}$ as determined by $K_1$ is preferably a relatively lower value.

More specifically, if the battery voltage is less than the maximum voltage to which the supply was set, then the maximum current output of the power supply has been attained, and the initial charging voltage may be directly set at or somewhat above that battery voltage level. In certain situations wherein there is a possibility that the charging system is connected to a shorted battery, it is desirable to start at a charging voltage at or slightly above the battery's open circuit voltage so that the system will start at a relatively low voltage and generally attempt to increase the voltage during the charging process.

If the current is less than the maximum, then the voltage is maximized and the voltage may be readjusted as a proportion of the inrush current over the maximum current. Thus, $K_1$ is proportional to the inrush current over the maximum current, $K_1=K_2 *I_{inrush}/I_{max}$, where $K_2$ may be varied according to charger and battery sizes. Consequently, if there is very little inrush current, the initial charging voltage will be close to OCV, while if the current approaches the maximum, the initial charging voltage will be set closer to the maximum voltage.

According to a primary aspect of the invention, once any desired initialization steps are completed, and the battery is otherwise deemed acceptable for charging, the system is prepared to begin charging the battery in a controlled, step-wise manner. In general, this is accomplished by charging the battery at a voltage that depends on a base charging level, and then adjusting the base charging level in the direction that provides a more optimal charge acceptance.

In order to determine the direction of a more optimal charge acceptance, the control circuitry adjusts the charging output to the battery in steps of predetermined magnitudes such that the steps form an upper pair and a lower pair of spaced-apart charging levels. A sensor measures the charge input to the battery at each of the charging levels and provides values representative thereof.

Figure 12A:
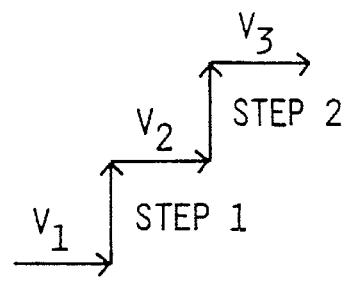
FIGS. 12A–12K are various probing profiles suitable for probing the battery for charge acceptance, illustrating the stepped output voltage settings over time and the adjustment to the charge based on the results of the probe.
Figure 12B:
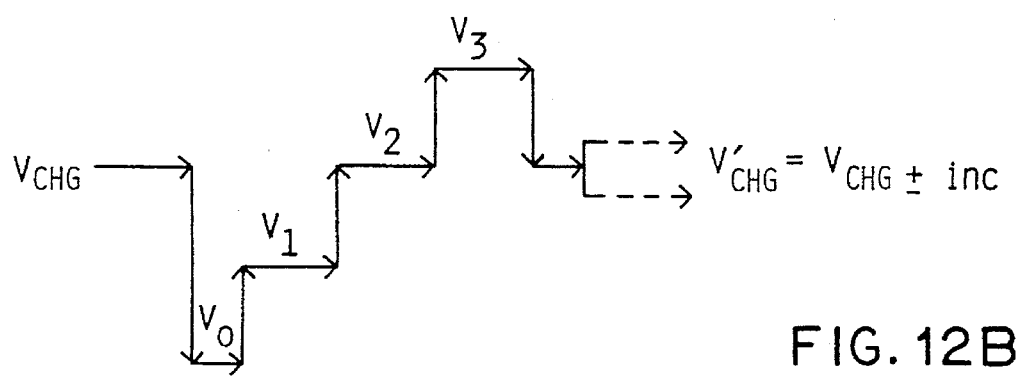
Figure 12C:
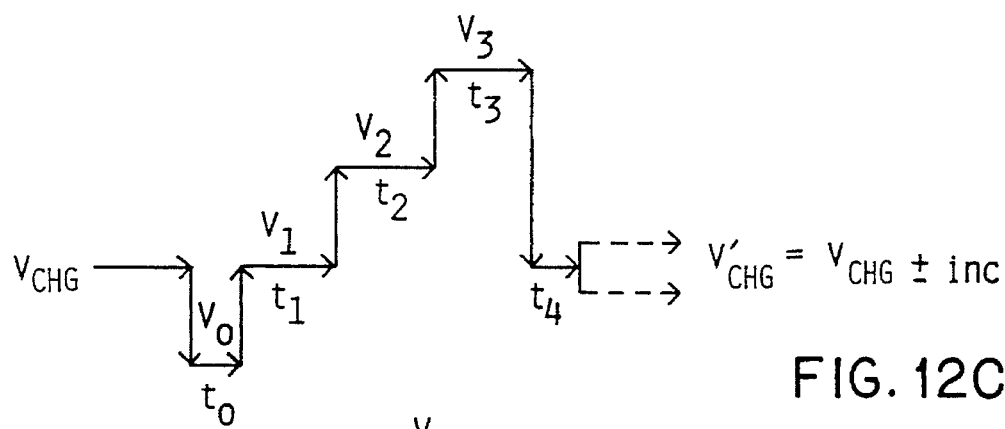
Figure 12D:
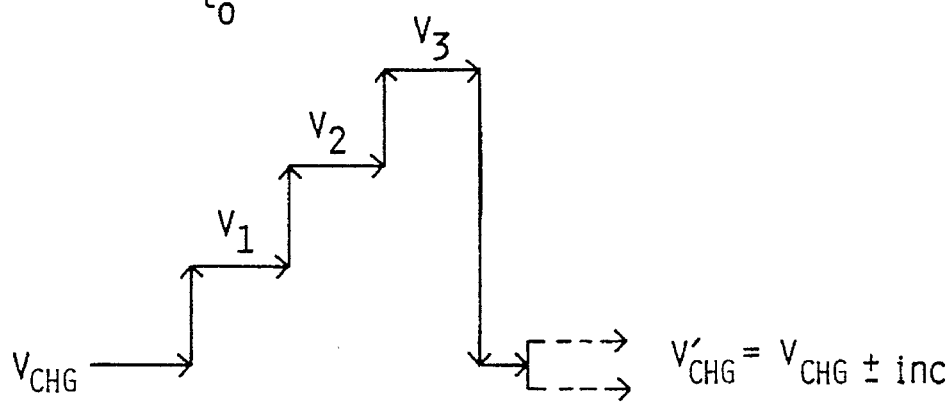
Figure 12E:
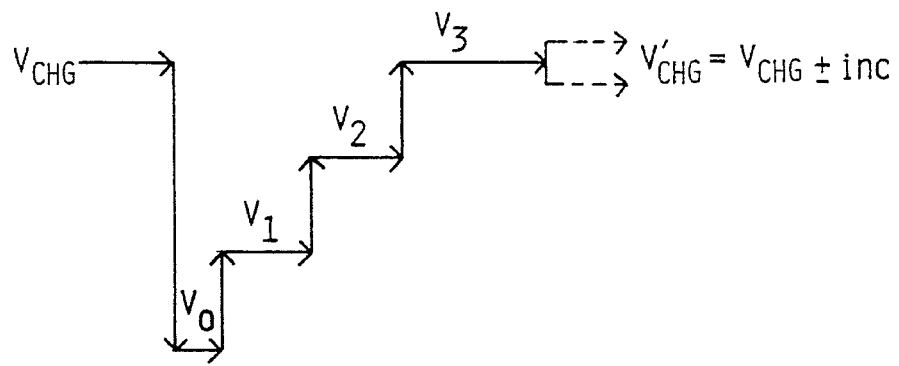
Figure 12F:
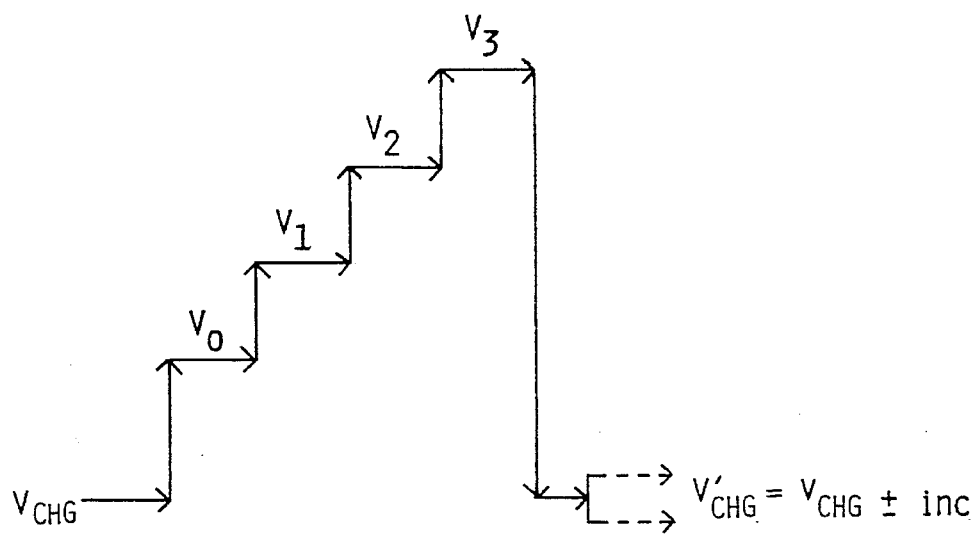
Figure 12G:
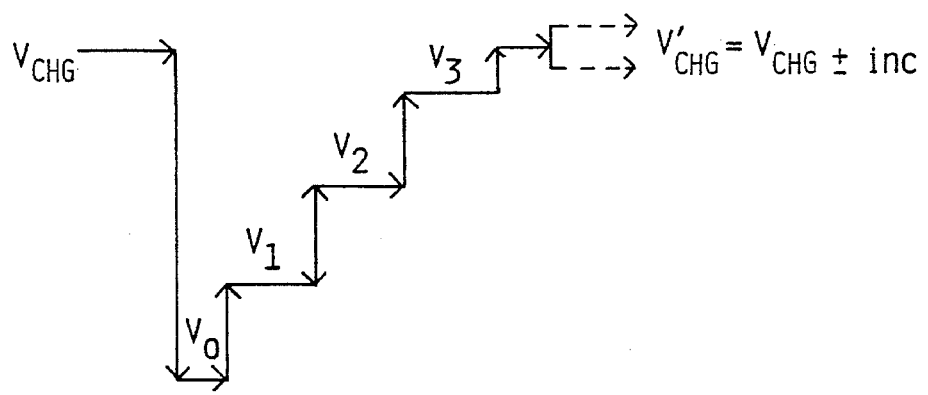
Figure 12H:
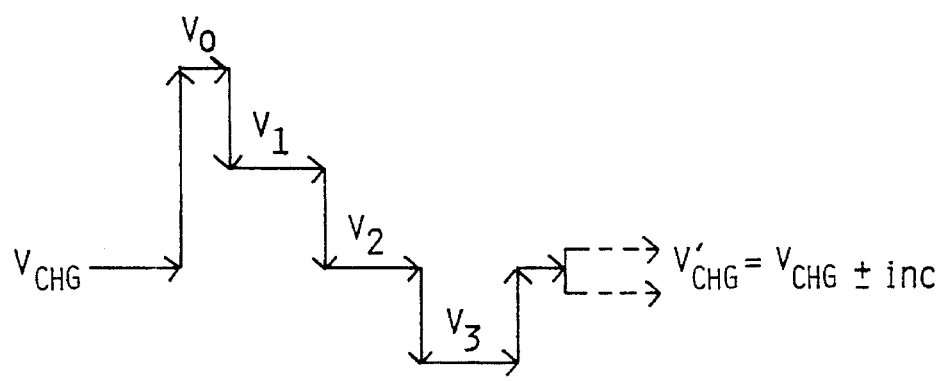

The pairs of spaced-apart voltage levels are based on the base charging voltage, and may be separated from one another, i.e., $V_4>V_3>V_2>V_1$ as shown in FIG. 12H, where $V_4$ and $V_3$ constitute one pair and $V_2$ and $V_1$ constitute the other. Alternatively, the spaced-apart pairs may overlap, i.e., $V_4>V_3>V_2>V_1$, where $V_4$ and $V_2$ constitute one pair and $V_3$ and $V_1$ constitute the other. In either the separated or overlapping situations, four separate voltage levels are required to provide the two pairs.

However, to minimize the number of measurements, it is desirable to use a voltage level for measuring current that is common to both the upper and lower current differential calculations. For example, as shown in FIG. 12A, voltage $V_1$ is separated from $V_2$ by a first step and $V_2$ is separated from $V_3$ by a second step. With these probing voltages, an upper differential using spaced-apart voltage pairs $V_3$ and $V_2$ may be calculated from the current measured at $V_3$ minus the current measured at $V_2$, while a lower differential using spaced-apart voltage pairs $V_2$ and V may be calculated from the current measured at $V_2$ minus the current measured at $V_1$. Preferably, the steps are of equal magnitude. This general concept of FIG. 12A may be more specifically implemented in a number of ways, including those shown in FIGS. 12B–12K.

One preferred method of stepping the charging voltage to probe the charge acceptance according to the invention is shown in FIG. 12C and described with reference to the flow diagram of FIGS. 3A–3C. In this particular method, after any initialization and initial charge is applied at steps 100 to 104, the voltage setting $V_B$ and current to the battery is first read at step 106.

Although it may be possible to measure the current values at the $V_1$, $V_2$ and $V_3$ (and alternatively $V_4$) voltage levels in any order, it has been found that for rapid measurements more consistency is obtained over a variety of battery types by adjusting the voltages in the same direction, preferably upwardly from a lowered level to $V_1$ to $V_2$ to $V_3$. Due to the capacitance of the battery, changes in the voltage cause the input current to move relatively substantially before settling after a brief time. Thus, both by delaying until the current substantially plateaus and ensuring that the current stabilizes in the same direction, the measurement is more consistent since the measured currents are all at substantially the same points in their approximate plateaus.

To this end, as shown at 108 and in FIG. 12C, the most recent charging voltage ($V_{CHG}=V_2$–step) is lowered to $V_0$, an amount which is preferably equal to one step ($V_{CHG}=V_{CHG}$–step) as shown at 108. Optional step 108 is desirably performed to condition the battery so that subsequent voltage steps (which provide the spaced-apart voltage pairs for measuring the current into the battery for differential calculations), are in the same direction and of the same magnitude. This reduces the effect of the battery capacitance on the varying charging voltages providing more stable readings and comparisons.

After a predetermined delay time, $t_0$, which allows the applied voltage $V_0$ and current to settle to a relatively flat level as described in more detail below, the current is measured as $I_0$ at step 110. As described below, this current reading $I_0$ is used in an average current calculation to determine if the battery is discharging rather than charging as a result of too low a charging voltage and to calculate capacity returned to the battery.

To accomplish the current measurement, the microprocessor 36 controls the analog switch 50 such that the analog-to-digital voltage converter 42 reads the voltage across shunt resistor 46, and then triggers the analog-to-digital voltage conversion. The shunt resistor 46 is ordinarily a precision resistor having a resistance value chosen in dependence on the maximum level of current that is anticipated as flowing therethrough, so that the current flow therethrough results in a suitable voltage. For example, very low resistance values, in the range of 0.1 to 1 milliohms, are chosen for chargers arranged to output 100 to 300 amperes. This gives a suitable voltage for measuring without unduly heating the resistor. As previously discussed, this voltage representing the current flow into the battery is ordinarily amplified such that the full range of the analog-to-digital voltage converter 42 generally corresponds to the full range of possible currents.

At step 112, the charging voltage is increased a step to another level, $V_1$, which, as can be appreciated, restores charging voltage to the level it was at before the conditioning step, but in an upward direction. After a delay time, $t_1$, which allows the current to settle, the charging input to the battery as indicated by the current flow into the battery is measured as $I_1$ at step 114 in the previously-described manner.

At step 116, the charging voltage is similarly stepped in an upward direction to $V_2$, whereby current reading $I_2$ is obtained at step 118 following a suitable delay time of $t_2$, thus providing current readings $I_1$ and $I_2$ at a first pair of spaced-apart voltage levels consisting of $V_1$ and $V_2$. Similarly, at step 120, the charging voltage is stepped in an upward direction to $V_3$, wherein current reading $I_3$ is obtained at step 122 after a delay time of $t_3$, thus providing current readings $I_2$ and $I_3$ at a second pair of spaced-apart voltage levels consisting of $V_2$ and $V_3$. Although not necessary to the invention, at steps 124 and 126 the charging voltage is lowered two steps and maintained there for a delay time of $t_4$, after which a current reading $I_4$ is obtained. As can be appreciated, step 124 again restores the charging voltage to the level it was at before the conditioning step. Note that the current reading $I_4$ is used in the average current calculation to determine if the battery is discharging and for determining the charging capacity.

At this point, the current measurements at the voltage levels that make up the first and second spaced-apart pairs are completed, and the process subsequently determines the direction that the base charging voltage should be adjusted to provide a more optimal charge acceptance. As discussed in more detail below, provided that certain extraordinary conditions are not present, the charging voltage is adjusted in a direction based on the lesser of the two current differentials $(I_2-I_1)$ or $(I_3-I_2)$. Thus, as the process is repeated, the base charging voltage continually adjusts in the direction that provides the more optimal charge acceptance as indicated by the current differentials.

To determine the direction to adjust the charging output, at step 128 the microprocessor 36 executes a number of calculations. First, an average current flow $I_a$ is calculated from time-weighted current levels of I and $I_0$ to $I_4$ measured in the loop. Alternatively, the average current $I_a$ may be determined by the quantity of amp-hours accumulated during the loop divided by the loop time. Secondly, the lower and upper current differentials $dA_1$ and $dA_2$ are calculated, which indicate the change in the charging input at the $V_2$ level from the charging input at the $V_1$ voltage level, and the change in the charging input at the $V_3$ level from the charging input at the $V_2$ voltage level, respectively.

Thus, in accordance with the invention, using these values the system controller 32 makes a number of decisions as to the direction to adjust the charging voltage. However, first at step 130, the actual battery voltage $V_B$ is first checked to make sure it is below the maximum allowable voltage, $V_{max}$ if any, that is known for this battery, such as by having been previously input. The actual battery voltage $V_B$ is used because the power supply voltage may be different than the battery voltage due to internal resistance and other reasons. If the battery voltage is above the maximum, at step 144 the charging voltage $V_{CHG}$ is immediately decremented and (after an optional delay of t at step 146) the routine returns to determine if charging is completed as described in more detail below. If the initial voltage was set correctly, below the maximum, only a small adjustment will be needed at or near the maximum voltage level when or if the battery voltage gets near that maximum level.

In the ordinary case, the battery voltage $V_B$ will be below $V_{max}$, so that step 132 will usually be executed. This step checks to determine if the average current flow is into the battery 24, i.e., the battery 24 is not discharging into the power supply 22. If the average current flow is indeed negative, this indicates that the battery is at a higher voltage than the power supply, and thus the charging voltage is increased by a predetermined amount at step 142. As can be appreciated from FIGS. 3A–3C, this incremental increase will repeatedly occur as the process loops until the charging voltage is higher than the battery voltage and current flow is in the appropriate direction.

Once the average current flow is determined to be positive, at step 134 the average current $I_a$ is optionally compared against a maximum current, $I_{max}$, which may be programmed into the system. If the average current exceeds the maximum current, then the charging voltage is reduced at step 138 in an attempt to reduce the amount of current that the battery is drawing.

In addition to or instead of the maximum current comparison, at step 136 one or both of the current differentials ($dA_1$ and/or $dA_2$) may be evaluated to determine if the power supply is outputting its maximum current. This evaluation is desirable if a maximum current is not known or if the maximum varies under differing conditions, such as in a dynamic charging environment, and can be further utilized to determine the maximum current. For example, if $dA_1$ is less than or equal to zero, and the average current is substantially above zero, the power supply is supplying its maximum current since the current level has not moved with the voltage change. Accordingly, in this condition the charging voltage is lowered until the charging apparatus returns to voltage control. Detection of this condition may also be used to inform the routine (at step 148, discussed below) that the current has not stabilized due to the end-of-charge condition, but rather because the power supply has reached its maximum current output capacity.

However, lowering the charging voltage only a single decrement amount may still lead to current levels (and therefore measurements) that are being artificially limited by the power supply. Without taking this current limiting possibility into consideration, unrepresentative differential values may be obtained, causing the voltage to again be incremented at step 142, thereby essentially failing to return the charger to voltage control. Thus, to ensure that the voltage is returned to voltage control, even if for only a single loop through the step routine, at step 138 the charging voltage, $V_{CHG}$, is lowered by a suitable amount, e.g., $V_{dec}$, and at step 144, the charging voltage is again lowered again by $V_{dec}$. As a result, in this condition the subsequent charging voltage is lowered by at least two decrements, which helps the charger return to voltage control.

Finally, during the typical step-charging procedure wherein the extraordinary conditions are not present or have been eliminated as described above, at step 140 the system controller 32 compares the differentials to determine which of the two pairs of spaced-apart voltage levels provided the differential indicative of a more optimal charge acceptance, as indicated by a lower current differential. Thus, if the upper of the two probing voltage pairs resulted in the smaller current differential, $(dA_2<dA_1)$, the base charging voltage $V_{CHG}$ is increased by a small amount, $V_{inc}$, at step 142. Conversely, if the lower of the two probing voltage pairs resulted in the smaller current differential, $(dA_1<dA_2)$, then the base charging voltage $V_{CHG}$ is decreased by a small amount, $V_{dec}$ at step 144, which is ordinarily, although not necessarily, the same magnitude as $V_{inc}$. Although not necessary to the invention, if the current differentials are equal, then the charging voltage is also decreased by $V_{dec}$ as a conservative measure. Regardless of the direction of the adjustment, after a predetermined delay at step 146, as described below the process returns to step 148 to determine whether the charging is complete.

If desired, the comparison of the differentials may be biased by calculating whether the difference between the differentials exceeds a selected amount, rather than by performing the above-described straightforward comparison between the two. For example, the base charging voltage $V_{CHG}$ will only be increased when the upper current differential minus the lower current differential exceeds a threshold amount. The amount selected as a threshold may vary over time and/or in dependence on other factors, for example, as a function of the input current. The amount selected as a threshold may, of course, be zero, which is equivalent to the straightforward comparison described above.

Note that while the battery is primarily described herein as being charged by controlling the applied voltage, it should be noted that if the battery is alternatively being charged by controlling the current with a variable current source, the result of the differential comparison is exactly opposite. In such a situation, if the lower of two pairs of spaced-apart current levels produced a larger voltage differential, the charging current is decreased.

According to the invention, the base charging voltage $V_{CHG}$ is continually adjusted in the direction of the more optimal charge acceptance. The process repeats until ultimately the charging voltage approaches and stabilizes in a range that provides an optimal charge acceptance for that battery. Within this range, the difference between step differentials is minimized. Any time that the optimal charge acceptance level begins to vary, for example as the battery approaches full charge or the internal battery temperature changes, the charging voltage simply adjusts its direction to compensate.

This method thus inherently compensates for the various charging factors influencing the battery, because it essentially lets the condition of the battery itself determine the optimal direction to adjust the charging voltage. Moreover, occasional erroneous measurements that may result from noise and the like are insignificant, because the charging level is only adjusted incrementally at any one time and subsequent steps quickly bring the battery back to the proper charging level. Thus, a certain amount of system noise and uncertainty is tolerable as long as the system controller generally remains in control. As a result, critical data measurements are unnecessary, enabling the use of lower cost components.

It must be emphasized that the process is not intended to actually calculate or determine an ideal charging voltage, only a direction to it. Accordingly, no complex calculations are necessary, only a decision as to whether to increase or decrease the charging voltage and the amount to adjust it.

Ordinarily, the amount that the charging voltage is increased ($V_{inc}$) or decreased ($V_{dec}$) is a fraction of the amount of the stepped-up (or stepped-down) probing voltages While there is no reason that the increment or decrement amount cannot equal the step magnitude, it has been found that smaller increment and decrement adjustments to the charging voltage with respect to the measuring step voltages tend to smooth out the overall process.

In addition, there is no reason that the size of the probing steps must remain constant throughout the charging process. For example, the magnitude of the steps can be tied to the level of current input, such as being set to a percentage thereof.

Any voltage increase or decrease that is capable of providing a measurable change in current levels is sufficient, however the step magnitude is preferably tuned to the power supply 22 and measuring system 34. Indeed, the power supply 22 should provide a stable output that rapidly responds to setting changes, while tile measurement system 34 needs to be sufficiently sensitive to measure differences in the power supply output at the levels used. For example, with power supplies having a relatively clean output and fast response, it has been found acceptable to employ a relatively small step size (e.g., twenty millivolts). The amount the charging voltage is incremented or decremented after the differential comparison may be one-half or less of this amount, (e.g., ten millivolts). If instead a noisier power supply is utilized, a larger step size tends to be preferable, (e.g., 80 to 100 millivolts) with an increment and decrement to the charging voltage of one-tenth of the step size. In general, it has been found that a 0.0005 to 0.2 volt adjustment for a 12 volt battery is satisfactory, with 0.01 to 0.10 volts steps having been successfully used in several tests that have been conducted. In general, larger probing steps may be used with smaller increments or decrements.

Moreover, the delay times $t_0$ to $t_4$ may be any value sufficient for the current to stabilize. It has been found that 0.1 to 0.4 seconds is sufficient for most switching power supplies, wherein the actual value is generally dependent on the step size and the response of the power supply 22 and the measuring system 34. Thus, a balance that depends on the particular power supply being used and the means of setting and reading charge levels ordinarily must be achieved between the delay time and the amount that the voltage is increased and decreased.

For example, the capacitance effects of the battery may influence the process if the delay is for too short of a time, even if the steps are all in the same direction. Conversely, the charge acceptance needs of the battery 24, which vary throughout the process, may change during too long of a delay time. It has been found that cycling the step-routine loop so as to adjust the charging voltage every one to two seconds is suitable. For example, at this rate if the adjustment to the charging voltage level is 0.01 to 0.02 volts, it takes 50 to 100 seconds to achieve a 1 volt adjustment. This is rapid enough to adjust to the changing charging requirements of substantially any battery.

In addition, to favor one charge acceptance direction over another, and thus charge the battery at a slightly higher or slightly lower voltage than would ordinarily occur, these times may be varied. For example, since capacitance in the battery influences the settling time of the current, the sooner that the measurement is taken after an upward voltage adjustment, the higher the current level at the time of the measurement. Thus, to be more conservative and keep charging at the lower portion of the optimized charging region, the measurement can be biased in favor of decrementing the voltage by reading the current level at the increased level sooner, i.e., $t_1$ and $t_2 > t_3$. This can ensure the battery is being charged with a lower amount of gassing. Alternatively, this directional biasing can similarly occur by making the steps unequal, or by multiplying one of the differentials by a biasing factor.

As can be readily appreciated, numerous methods of providing the increased and decreased charging output levels are feasible. For example, rather than stepping-up the voltage in discrete increments, the voltage can alternatively be ramped continuously between the probing levels, with charging input measurements taken at least at the points on the ramp corresponding to the $V_1$, $V_2$ and $V_3$ outputs. Also, rather than generating the output by a microprocessor, it is feasible to combine a time-varying signal with a DC charging output such that the desired probing levels are obtained. For example, stepped, sinusoidal, square-wave and sawtooth patterns can be impressed on a base DC voltage for modifying the applied level at a predetermined frequency between known levels, thus requiring that only the base voltage be directionally adjusted.

In addition, more than one discrete step in each differential range can be used with this system. However, this complicates the calculations and increases the system complexity and cost without providing any substantial benefit, since the use of single step differentials to adjust the charging output achieves virtually the same result.

It can be readily appreciated that as the probing voltages are applied, charging is occurring at output levels that are based upon a nominal base voltage that tracks the more optimal charge acceptance. The probing levels are dependent upon this base charging level $V_{CHG}$. Although in a given charging profile this nominal base voltage may be selected to be a voltage centered between upper and lower probing voltages, such as with the level of $V_{CHG}$ in FIG. 12B being the same as $V_2$ (and thus between probing levels $V_1$ and $V_3$), the actual charging voltage from which the various steps are made may be a value different from any central voltage.

For example, FIG. 12C shows a base charging voltage $V_{CHG}$ that is the same as the lowest of the probing levels ($V_1$) depending therefrom, FIG. 12D shows a charging voltage $V_{CHG}$ that one step below the lowest probing level ($V_1$), while FIG. 12E shows a base charging level $V_{CHG}$ that is the same as the highest of the probing levels ($V_3$). FIG. 12F shows a charging voltage $V_{CHG}$ that is an amount below the lowest probing level ($V_1$) that is not any whole number multiple of step magnitudes, while FIG. 12G shows a charging voltage $V_{CHG}$ that is at a level above the highest probing level ($V_3$) and again is not any whole number multiple of the step magnitudes.

Figure 12I:
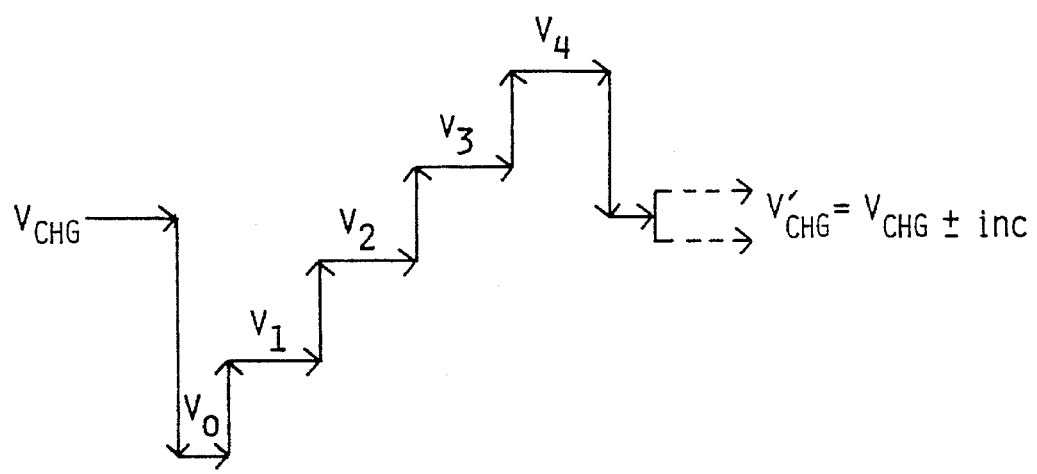
Figure 12J:
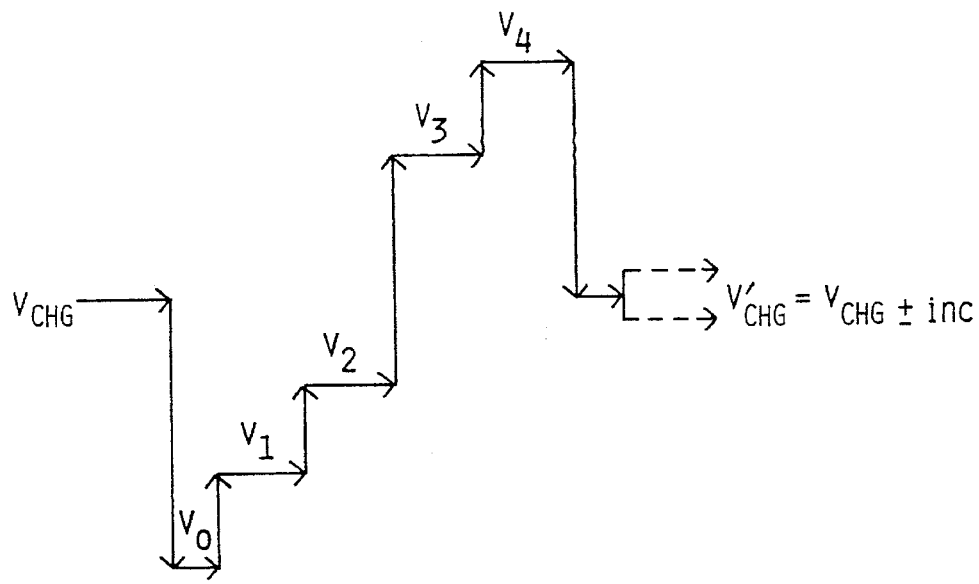
Figure 12K:
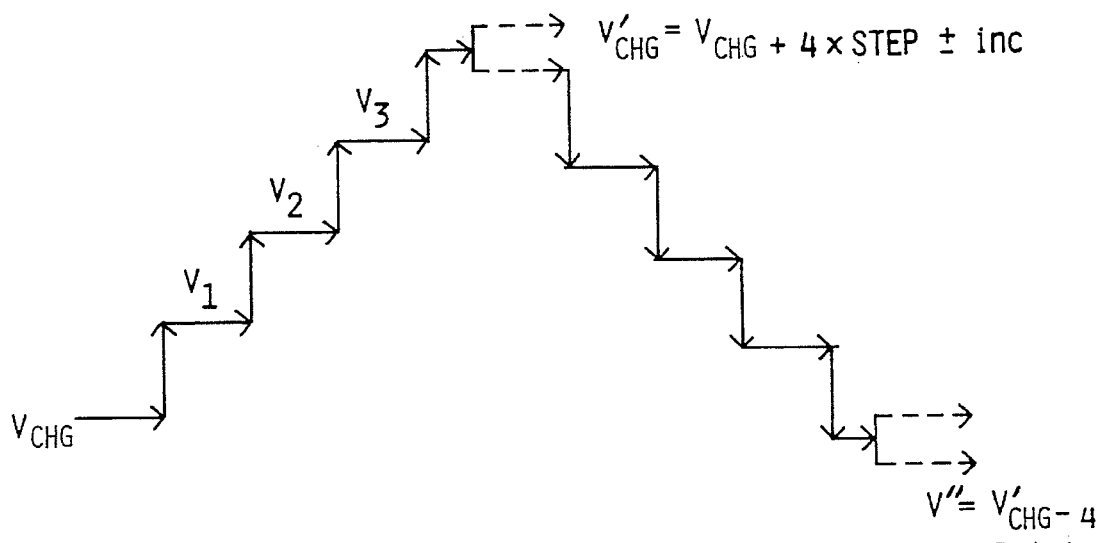

Moreover, the differentials do not have to be calculated using a probing voltage level common to both. FIGS. 12I and 12J show such profiles, wherein the differential $dA_1$ is obtained from the difference of the currents measured at $V_2$ and $V_1$ and the differential $dA_2$ is obtained from the difference of the currents measured at $V_4$ and $V_3$. Indeed, a way in which to consider the preferred three-level probing profile is that it comprises a more specific variation of the general four-level profile wherein $V_2$ equals $V_3$. Alternatively, the spaced apart pairs that provide the differentials may overlap, i.e., the differential $dA_1$ is obtained from the difference of the currents measured at $V_3$ and $V_1$ and the differential $dA_2$ is obtained from the difference of the currents measured at $V_4$ and $V_2$.

Further, the steps do not have to be in any directional order, and indeed, successful charging has occurred with a series of probing steps in a downward direction as shown in FIG. 12H. It is even feasible to combine upward and downward steps as shown in the step profile of FIG. 12K. However, with downward steps, the above-described routine may need to be appropriately modified to better accommodate the conditions wherein the power supply limits are reached.

Finally, while FIGS. 12A–12K show a number of voltage profiles, there is no intent to limit the invention to only those profiles disclosed, as other profiles will still provide the desired result. Moreover, although voltage charging profiles are illustrated, the invention has successfully recharged batteries using current charging having similar profiles.

While it is convenient to measure only current differentials for steps of equal voltage, yet another way to decide on the direction to adjust the base charging voltage comprises obtaining relative current differentials with respect to voltage changes, i.e., a slope of dI/dV. Voltage steps can thus be of unequal values, since the proper direction can be determined by factoring the slope dI/dV into the differential calculations.

Finally, as previously described, when using single steps to reach $V_1$, $V_2$, and $V_3$, the delay times between probing measurements and other times may be varied, along with the amount of he stepped probing outputs and the adjustments incrementing or decrementing the charging voltage.

Of course, to make an even more effective charging system, further diagnostic and charging routines may be added. For example, at step 148 of FIG. 3A the battery is checked to determine if it has been sufficiently charged by evaluating the current flow into the battery. If sufficiently charged, the charge may be terminated, the charger may enter a maintenance mode, or an extra amount of charge can be added at that time to condition the battery including fully charging the electrodes and destratifying the electrolyte where applicable, particularly when charging a flooded battery. Of course, as indicated by step 150, a maximum safety time can be programmed into the system.

The level of charge at which to terminate step-charging may depend on the type of battery being recharged and/or the extra finishing steps desired. For example, if no further steps are desired, then a steady current for a long period of time may be used as an indication that the battery is fully charged. Of course, such a current must also have a low value so that it is differentiated from the steady current that results when the power supply is at its maximum output level, as described previously with reference to step 136 of FIG. 3C.

Alternatively, if conditioning via a destratification mode is desired, (such as determined by a switch setting on the user-input 58), there is no reason to wait for a full charge to be completed. In such an instance, full charging can be completed during the conditioning or destratification step. Thus, the charge may be determined at step 148 to be substantially sufficient, e.g., if the current flow has reduced to ten percent of the AH capacity input from the start of the recharge.

Thus, after sufficient charging is determined at step 148, (or if the maximum time is exceeded at step 150), and if destratifying (or other conditioning) is desired at step 152, the system controller 32 controls the power supply 22 at step 154 to provide an increased charging output level to the battery for a period of time. Generally the time and/or output level is based oil the ampere hour recharge capacity of the battery. For example, an excess charge of such as 15% of the capacity may be added.

More particularly, destratification may take place by providing a constant current flow into the battery at step 154. A suitable value for the current is ten percent of the amp-hour recharge capacity put into the battery, i.e., if the battery capacity was recharged by 50 Amp-Hours, 5 Amps is a suitable destratification current. Of course, a minimum current may be substituted depending on the battery type, such that destratification is ensured. For example, if a normal-sized (e.g., 30 to 100 AH) automotive battery was recharged with only two amp-hours of capacity, 0.2 Amps will probably not produce acceptable destratification within a suitable time period. Thus, three Amps of current may be substituted for this value, based on ten percent of a 30 Amp-hour capacity of the smallest of typical automotive batteries.

Once charging (including any overcharging to destratify) is complete, at step 156 the charger will then either be shut off, or programmed to enter a maintenance mode, which may comprise periodically turning the charger on to charge the battery, or preferably maintaining the battery in a float condition with a reduced voltage. Ordinarily, the end-of-charge condition is detected by a substantially constant output level, i.e., the average current remains relatively flat. For example, a drop of less than 0.05 to 0.1 amperes over 2 to 3 minutes has been successfully used as an indication of when a full charge condition has been reached.

Figure 4:
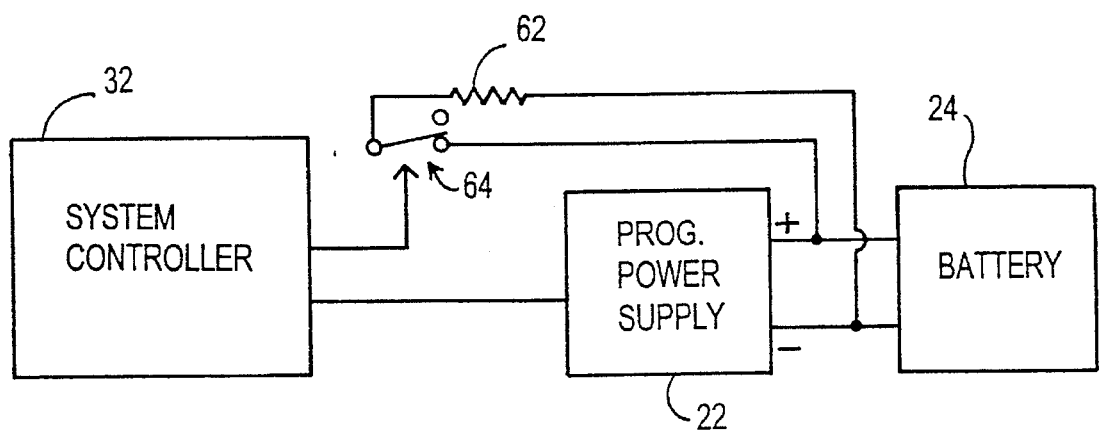
FIG. 4 is a block diagram of an optional resistor switching apparatus for achieving a better float condition.

At full charge, if the average step current fluctuates into negative values, some power supplies have difficulty handling the transition from negative to positive current, resulting in a response higher than would otherwise be desirable in the float condition. If a permanently connected power supply resistor 31 is not present, as shown in FIG. 4, a resistor 62 selectively added to the system will provide a means for the power supply 22 to maintain a positive output, thus resulting in a lower average voltage and current necessary for a long-term float. During the float mode, the system controller 32 may control means 64 such as a relay, a switch or the like to automatically connect the resistor 62 across the terminals. Of course, the means 64 can also include any feasible way to manually connect the resistor.

Moreover, the resistor may be internal to the power supply, and if desired, permanently connected, e.g., resistor 31 of FIGS. 1 and 2. Although such a permanent resistor will always shunt some current therethrough, as described previously a substantially high resistance value will ensure that the current drawn thereby is relatively low, such as 1 ampere with a power supply capable of outputting current on the order of 100 amperes. Finally, it can be readily appreciated that in a dynamic recharging environment such as in an automobile, the load provided by the automobile components will generally obviate the need for adding additional resistance.

The charging system described herein is feasible for use in both stand-alone chargers and in the dynamic vehicle environment. Since the step charging technique described herein is substantially instantaneous in its measurements and rapid in its adjustments, it adapts well to the wide-ranging conditions present in automotive charging. When incorporated into a vehicle the described controller can regulate an automobile alternator to adjust the charging voltage until the battery is charged, based on the charge acceptance needs of the battery and the variable output of the alternator. However, he system should be set to have an upper voltage limit determined by the other automotive components therein, with a reset to that limit or a convenient nominal voltage after every battery discharge. Of course, the charging system would never be shut off during vehicle operation.

As can be seen from the foregoing, a method and apparatus have been provided for charging a battery that approaches an optimized level of charge acceptance by regularly adjusting its electrical charging output to the requirements of the battery. The disclosed battery charger inherently compensates for factors influencing charge acceptance requirements, and provides a simple and efficient method and apparatus for charging a battery that automatically adjusts to determine an optimized recharging current and voltage profile for the battery based on its requirements. The battery charger is capable of efficiently and safely charging batteries of various types and sizes while controlling the amount of gassing, and can be combined with other charging techniques for handling diverse conditions and controlling the various phases of a charging operation.

EXAMPLES

The following examples were obtained with the step-charging technique implemented in software instructions written in the BASIC programming language (Microsoft QuickBASIC 4.5) being executed on a 386DX20 personal computer. The computer was connected to a Hewlett-Packard HP6031A programmable switching power supply by an IEEE488 (GPIB) interface bus. The starting voltage was the OCV+1.5 volts. A maximum of 18 volts was set, and the current was set to the maximum available based on the power supply limit of 1200 watts. (As seen in the following examples, this causes the current to initially taper down as the voltage rises because the power supply cannot supply enough power.) The upward step voltage and increments were 20 millivolts, with a timing delay of 0.2 seconds after each of the first two steps, and the third step biased with a reduced delay time of 0.7 times the delay time used in each of the previous steps. No conditioning step was used.

EXAMPLE 1

Figure 5:
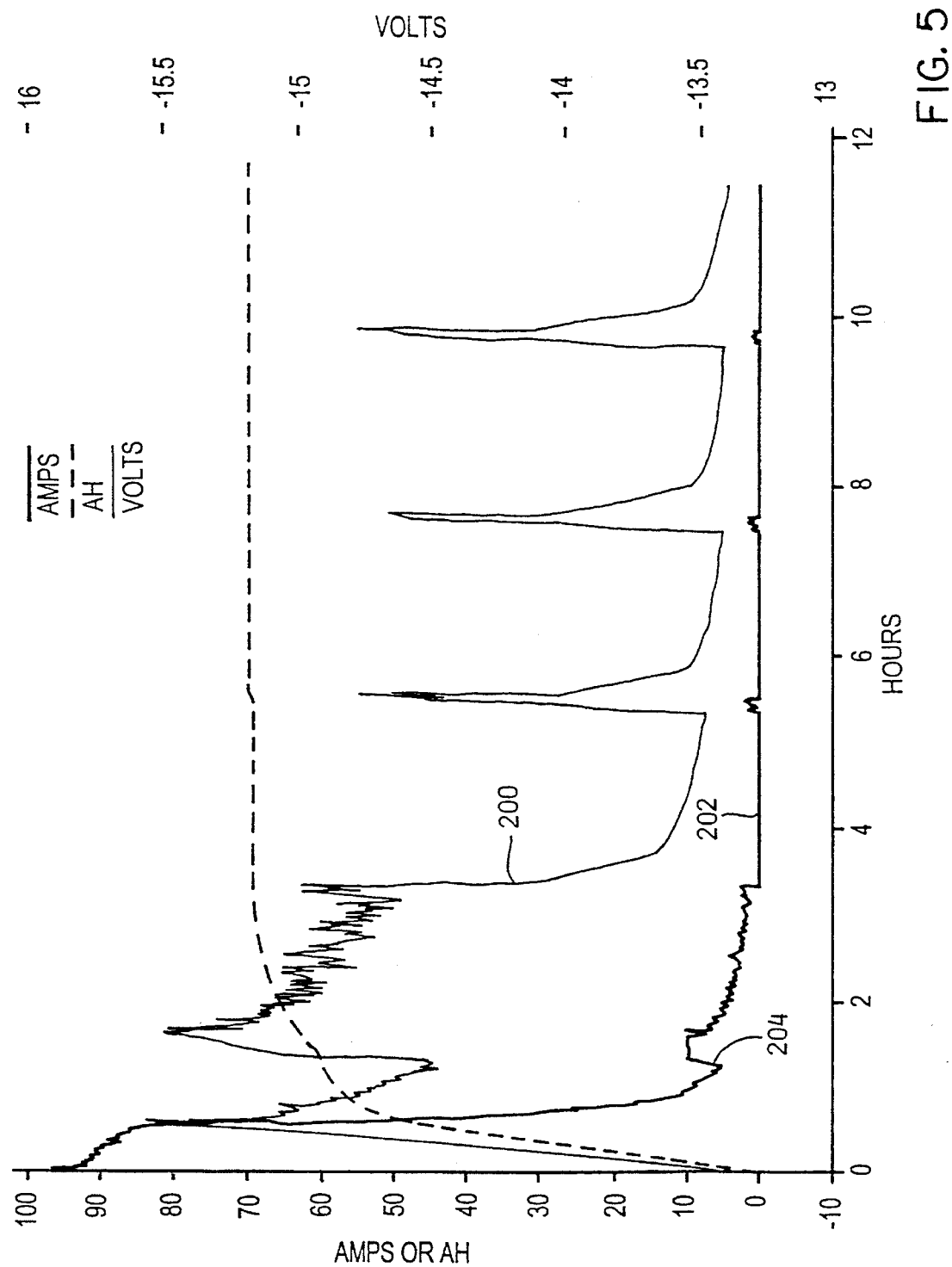
FIGS. 5–11 are graphical representations of the charging profiles for selected batteries at various charging conditions and having various histories.

FIG. 5 illustrates the charging process employed to recharge a Gp27 (AP105) flooded deep-cycle battery with hybrid alloy construction. This type of battery is typically used in marine applications such as to power a trolling motor, and thus a quick recharge is desirable. In preparation, the battery was discharged at 25 amperes until a voltage of 10.5 volts was achieved, approximately 150.9 minutes.

As shown in FIG. 5, wherein voltage is indicated by line 200 and current by line 202, the battery was recharged to 100% of its discharged capacity in approximately one hour. As the average current stabilized, indicated by point 204 on the graph, a programmed overcharge period employing a timing bias favoring an increased voltage was added for several additional hours to increase gassing to destratify the battery electrolyte. During the overcharge, the current Output was limited to a maximum of 10 amperes. This was followed by an indefinite maintenance period during which the charger was periodically turned on, as indicated by the voltage spikes.

EXAMPLE 2

Figure 6A:
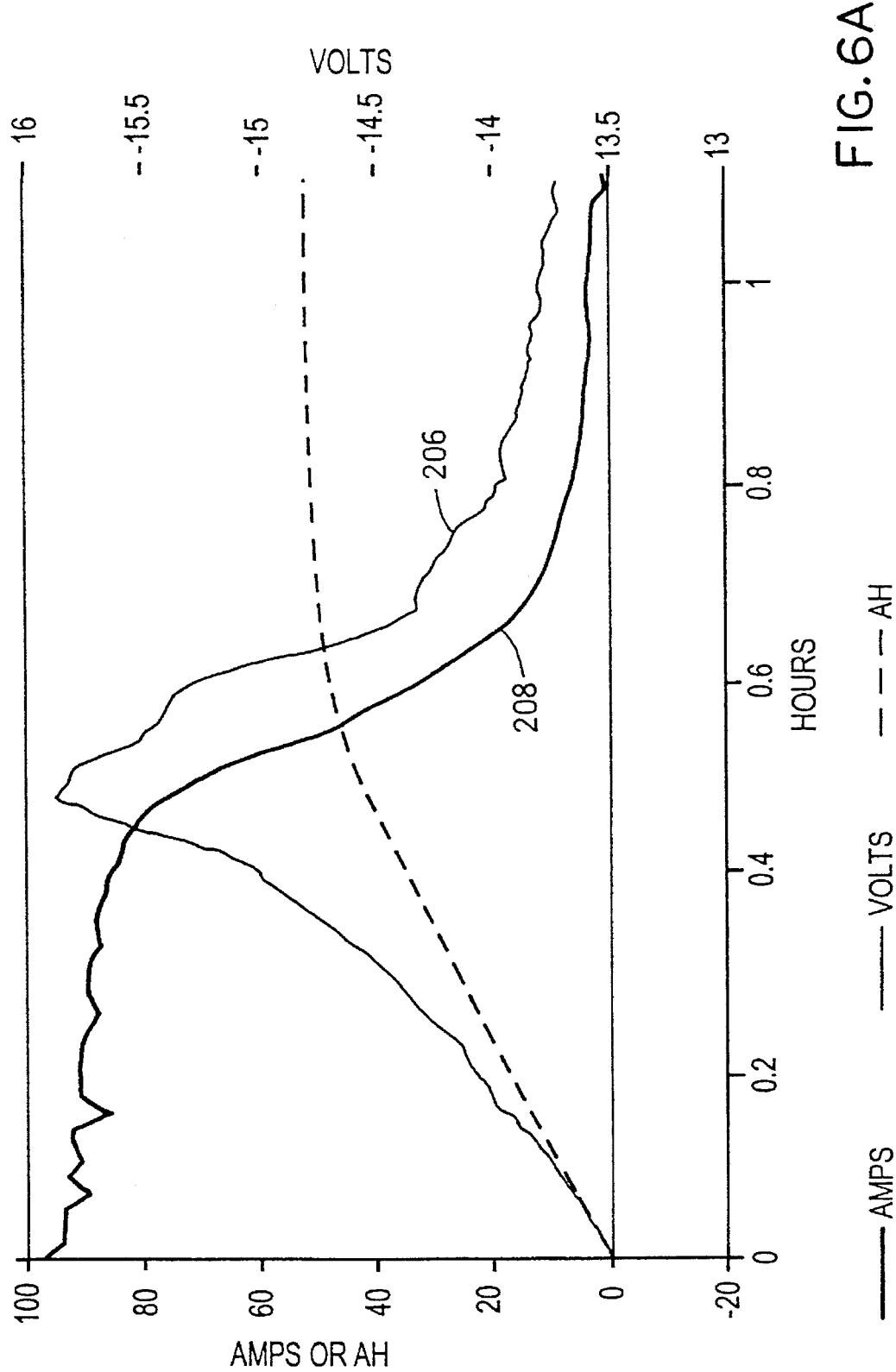

FIG. 6A illustrates the charging process employed to recharge a Gp27 VRLA recombinant battery, discharged in the same manner as the battery in example 1. As can be seen from FIG. 6A, wherein voltage is indicated by line 206 and current by line 208, the battery was quickly charged and automatically reduced to a low-end value to allow gas recombination without excess heating. No destratification step is normally needed with this type of battery.

Figure 6B:
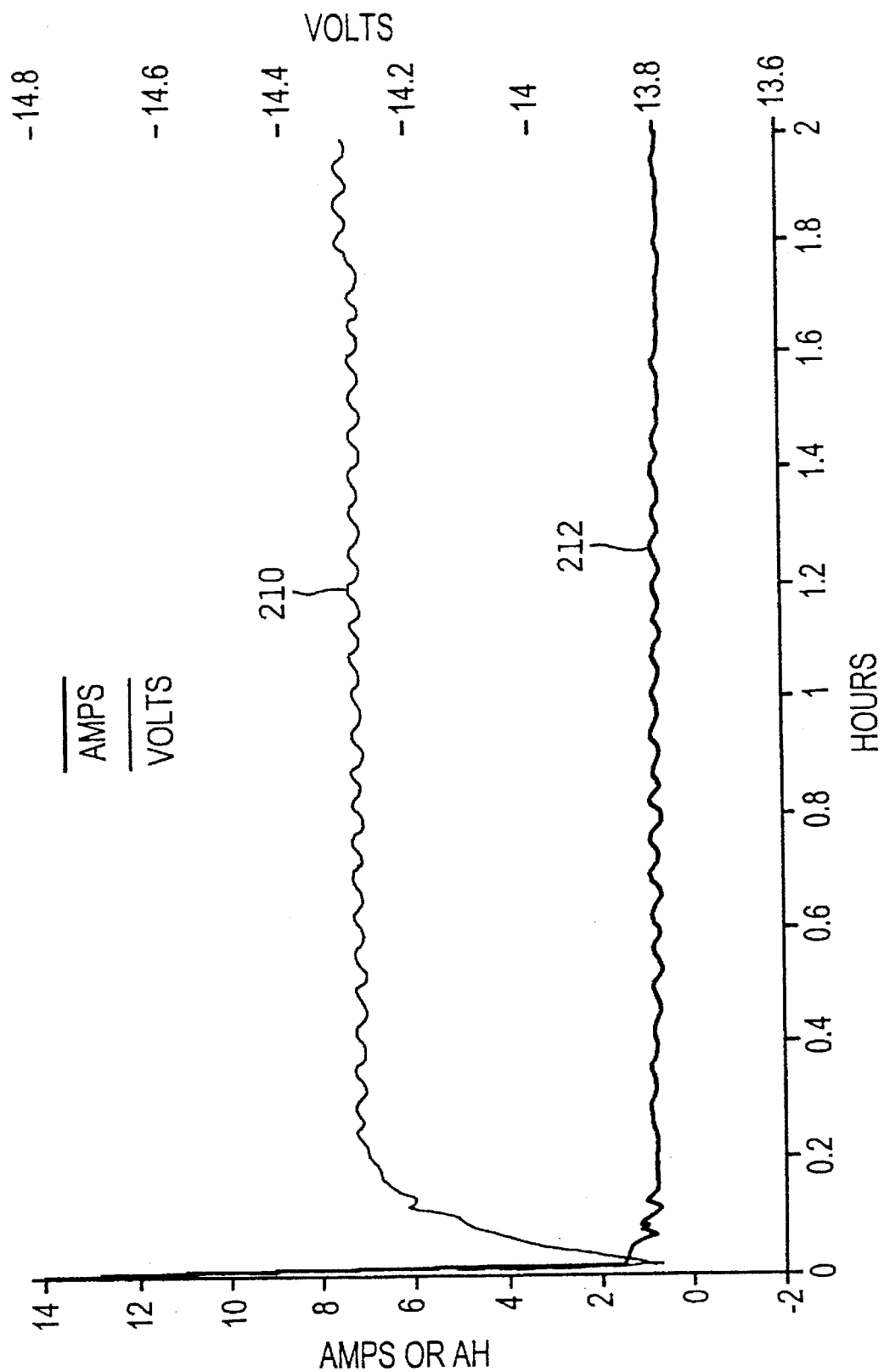

FIG. 6B illustrates the same type of battery as that used to create FIG. 6A, however in FIG. 6B the battery is connected to the step-charger when fully charged. As shown, the low steady current (line 212) and steady voltage (line 210) is quickly reached, eliminating any tendency towards thermal runaway.

EXAMPLE 3

Figure 7:
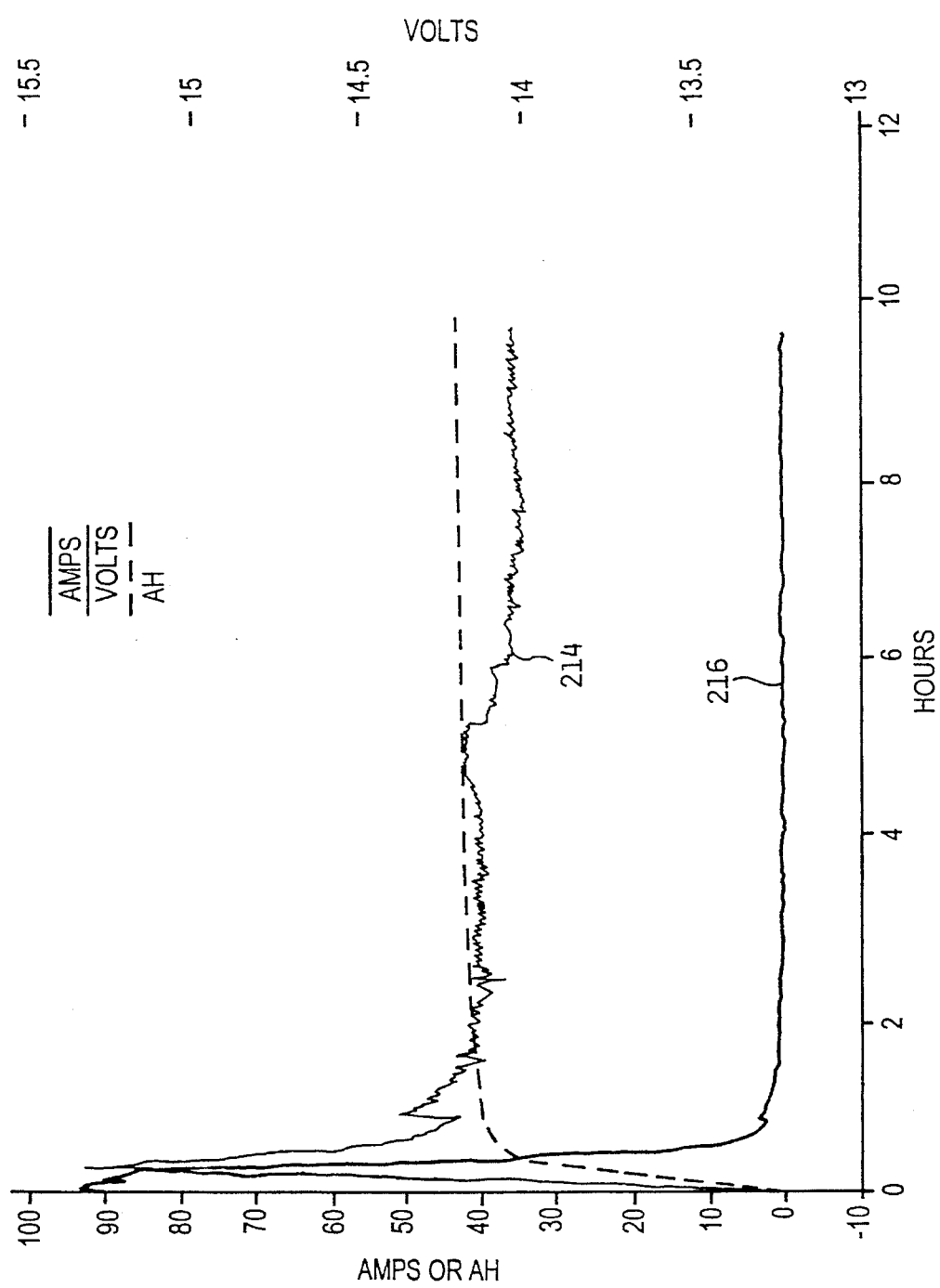

FIG. 7 illustrates the charging process employed to recharge a Gp2670 SLI maintenance-free (automotive) battery, discharged in the same manner as the battery in Example 1. The graph, wherein voltage is represented by line 214 and current by line 216, demonstrates that the step-charge system can allow a battery to remain on charge unattended for longer periods of time without severely overcharging and drying out the battery.

EXAMPLE 4

Figure 8:
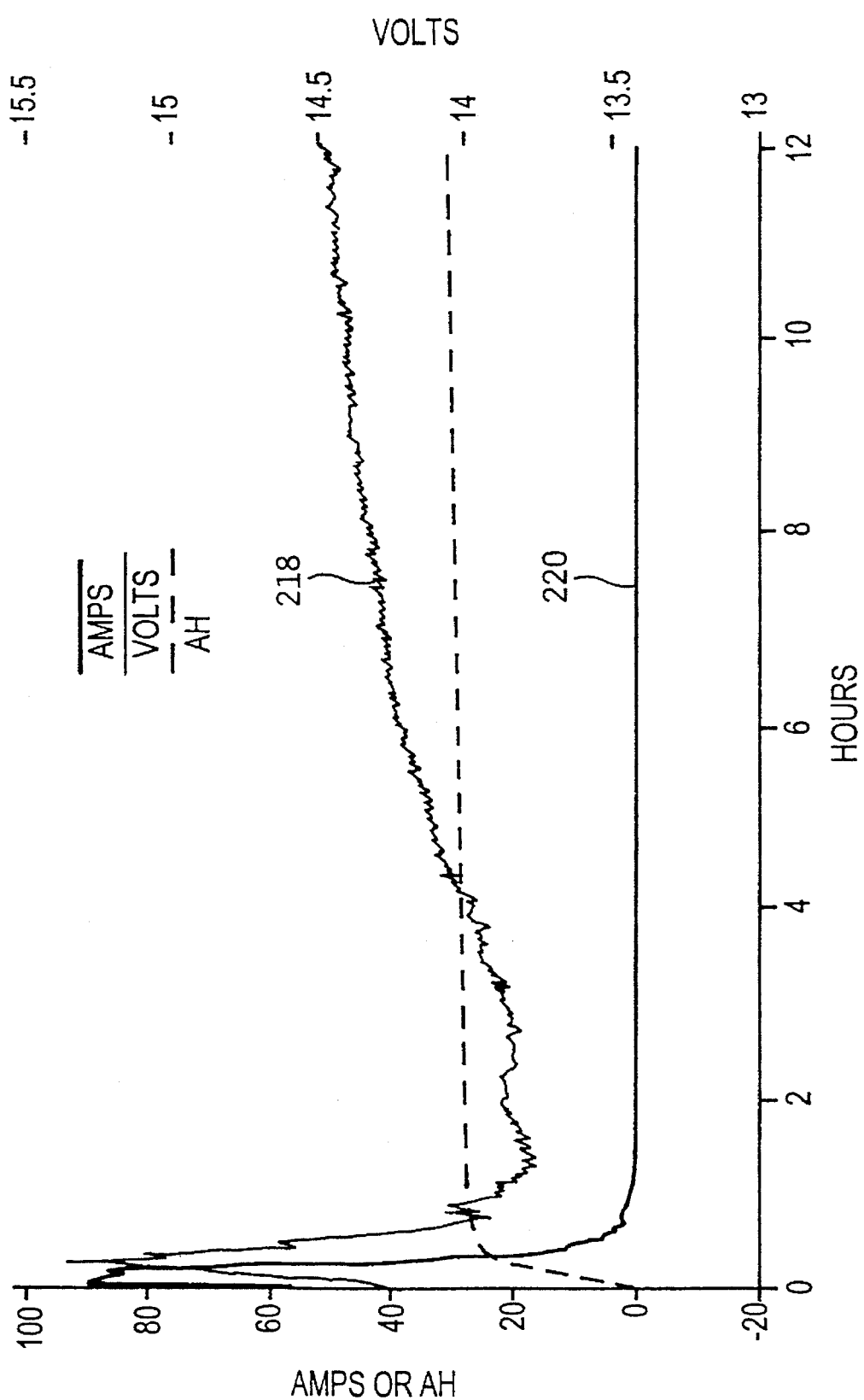

FIG. 8 illustrates the charging process employed to recharge a Gp40 battery having antimonial grid alloys in both the positive and negative electrodes. Again, the charger safely reduced the end voltage (shown by line 218) and current (shown by line 220) to very low levels, even with the added gassing effects of the antimony impurities.

EXAMPLE 5

Figure 9A:
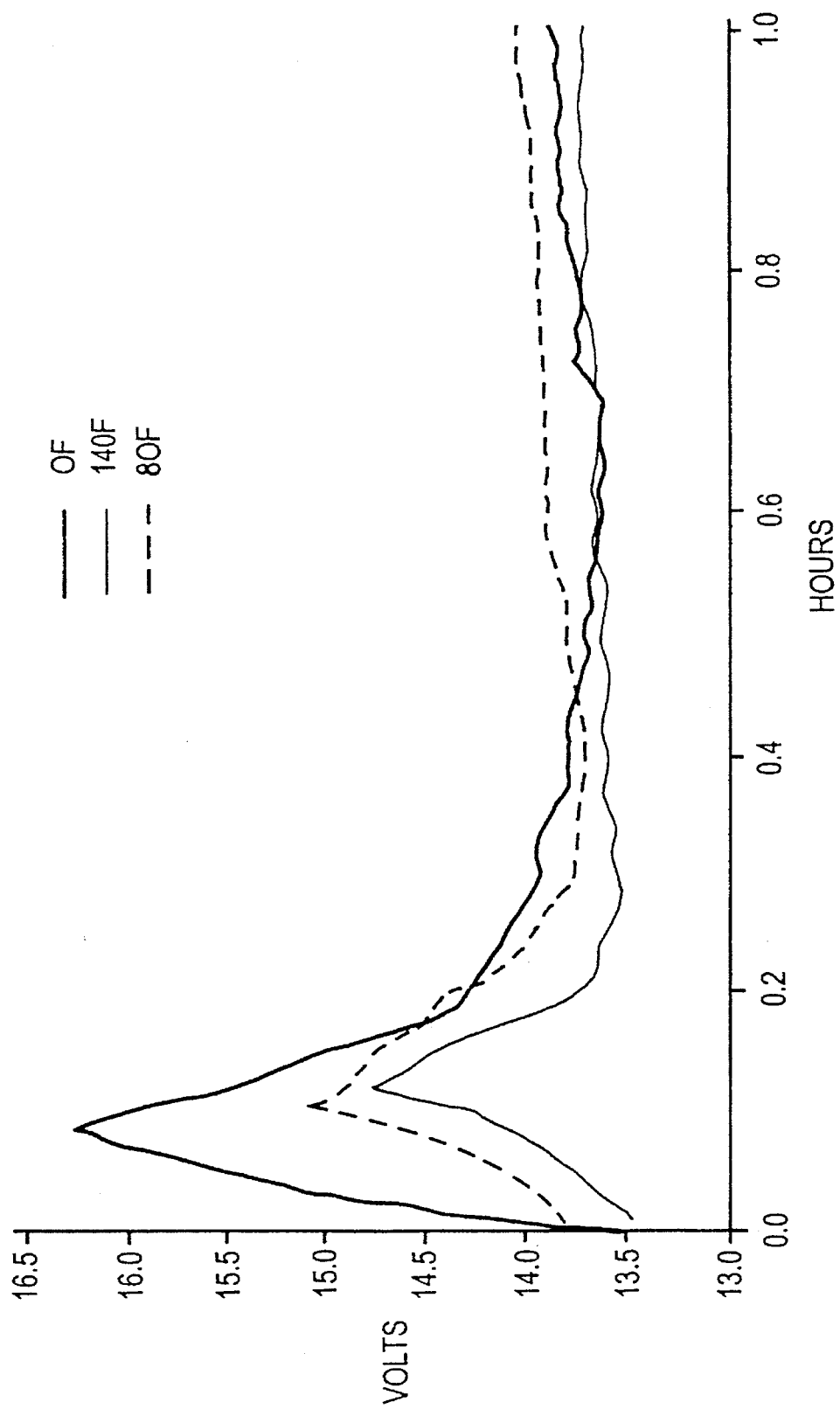
Figure 9B:
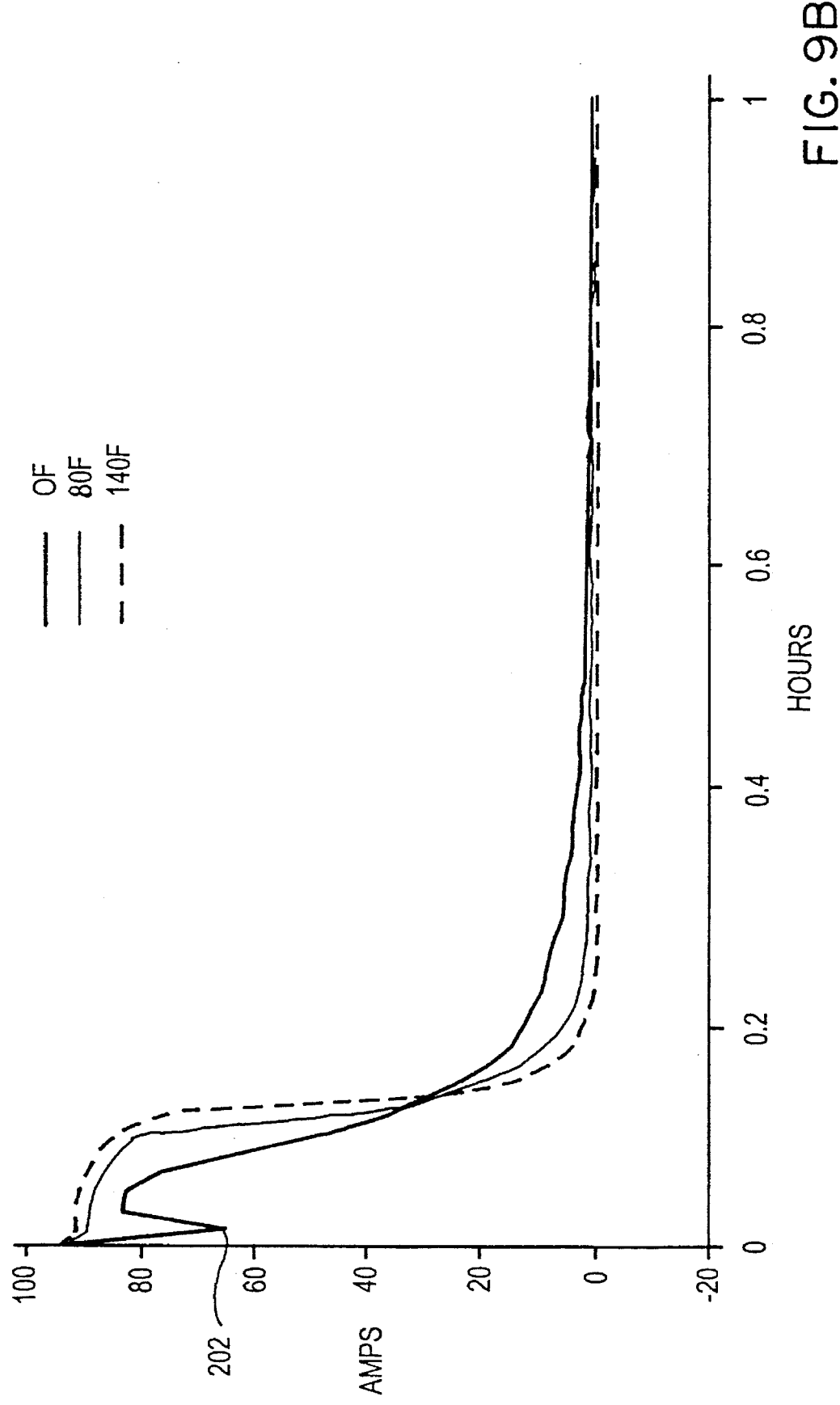

FIGS. 9A–9C illustrate the charging process for voltage, current, and ampere-hours, respectively, at three different temperatures: 0 degrees Fahrenheit, 80 degrees Fahrenheit, and 140 degrees Fahrenheit. A Gp2670 SLI battery was discharged the same amount (300 amperes for 139 seconds) at each of the temperatures. As shown, the step charger displaces the voltage the necessary amount to compensate for temperature and resistance differences during charging. Additionally, it can be seen that voltage compensation is minimized once the battery is fully charged to the point of needing no further charging, in contrast with other temperature compensation methods that treat the float voltage the same as the charging voltage.

FIG. 9A illustrates the result of starting at a charging voltage significantly lower than the battery might optimally be started at. This is because $OCV+K_1$ was relatively low for the zero degree charge. Nevertheless, the subsequent zero degree voltage and current profiles clearly show that the step charging process quickly adjusts the voltage to optimize charge acceptance regardless of the starting voltage.

EXAMPLE 6

Figure 10:
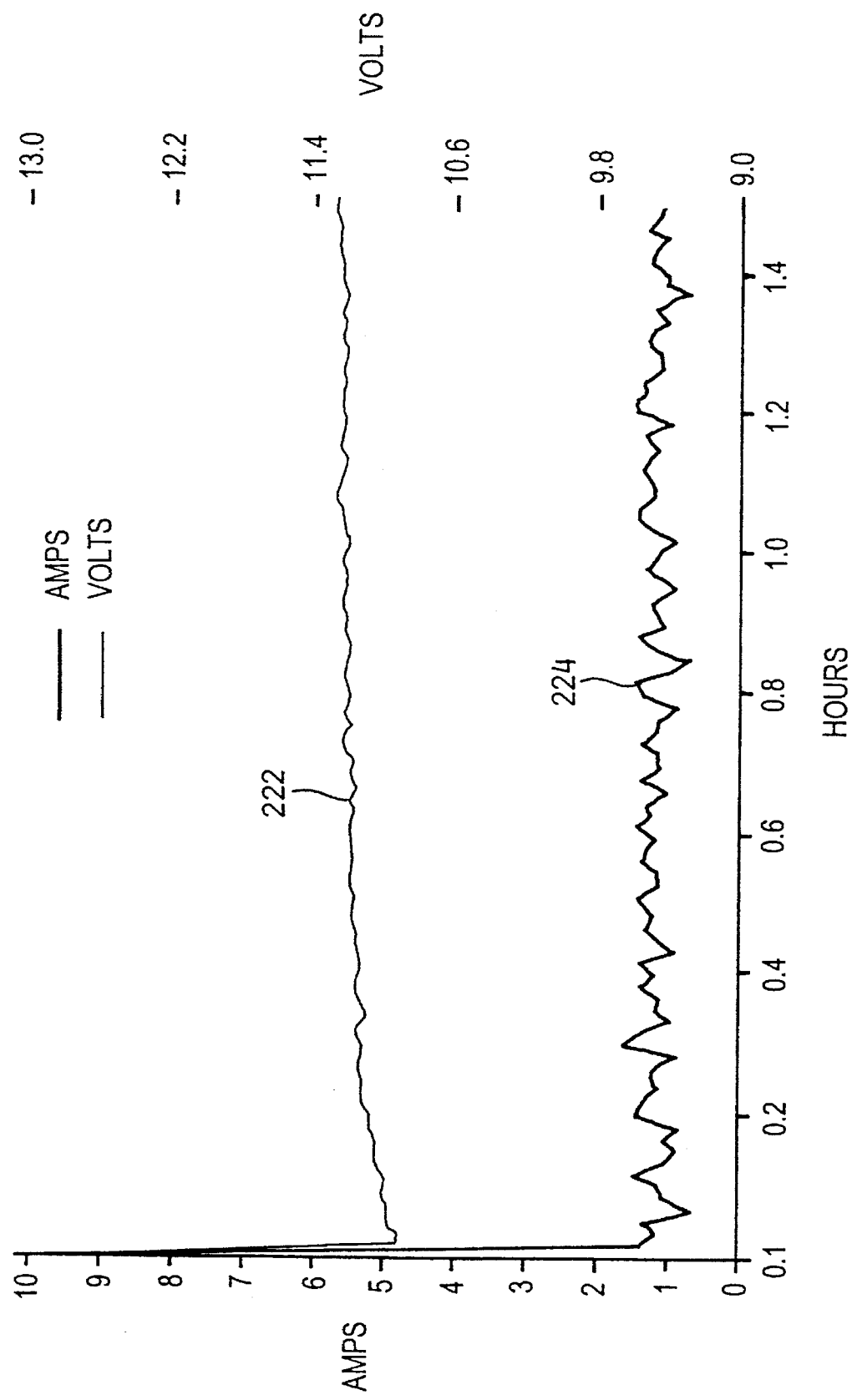

FIG. 10 illustrates the step-charger according to the invention being connected to a Gp24 battery with a shorted cell. The battery was connected without discharging. As can be seen, the voltage (line 222) quickly is lowered to the reduced level of the shorted battery and a very low current (line 224) is input to the battery. It should be noted that the same battery, when put on a conventional 15 volt fixed voltage charger with a 25 ampere maximum output drew the full current producing excessive gas and heat in the non-shorted cells.

It can readily be appreciated that the charging system herein is capable of detecting such a shorted condition to shut off the power provided that the desired end voltage is input to the system. To this end, user input 58 can be set (for example by setting a user-controlled switch thereon) to communicate the voltage of the battery (i.e., 6 volts, 12 volts, and so on) to the system. Thus, if the system detects that the average current over a period of time is substantially stabilized, then the system may check the actual voltage level with a voltage corresponding to the minimum acceptable programmed level to determine if the battery is shorted.

EXAMPLE 7

Figure 11:
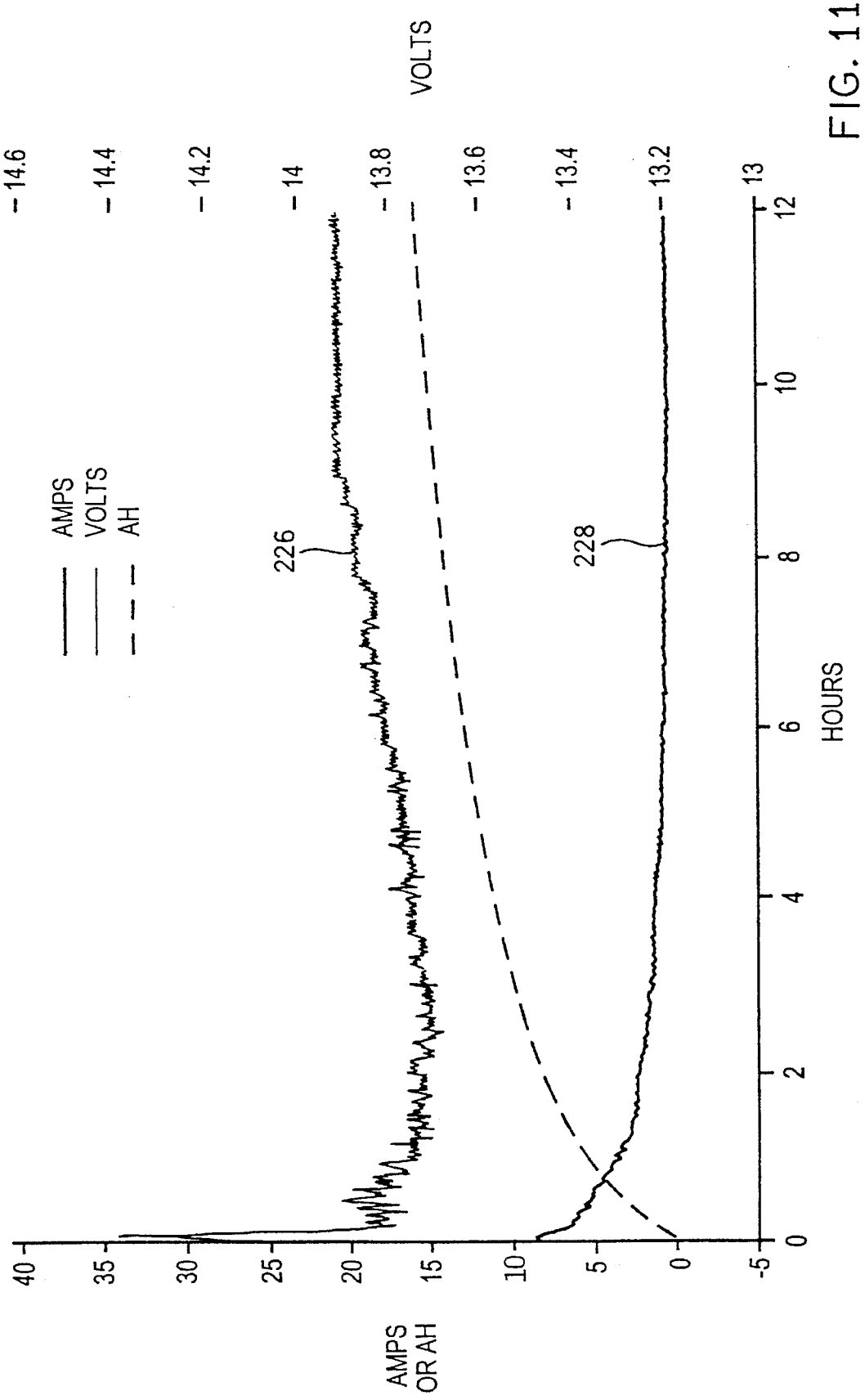

In this example, shown in FIG. 11, a Gp2670 SLI battery was self-discharged as a result of standing a six month ambient period before being connected to the step-charger. The charge acceptance of such a long-standing battery is greatly reduced, as determined by the rate of dissolution of lead-sulfate. Accordingly, such a battery cannot be rapidly charged in an efficient manner. As shown in FIG. 11, wherein voltage is indicated by line 226 and current by line 228, the step-charger recharged the battery at an effective charging rate based on the level of charge acceptance dictated by the battery. Although the maximum charger current output was not reached, the battery was charged for a period of time long enough to approach full charge.

What is claimed is:

1. A method of charging a battery, comprising the steps of:

applying an electrical charging output to the battery in dependence on a base charging level;

adjusting the charging output to provide a plurality of charging levels comprising an upper pair and a lower pair of charging levels, each of the charging levels in the upper pair distinct in magnitude from one another and each of the charging levels in the lower pair distinct in magnitude from one another;

measuring a charge input to the battery at each of the charging levels comprising the upper pair and at each of the charging levels comprising the lower pair;

calculating a lower differential from the difference in the charge inputs at the two charging levels comprising the lower pair of charging levels, and calculating an upper differential from the difference in the charge inputs at the two charging levels comprising the upper pair of charging levels comparing the lower differential and the upper differential; and adjusting the base charging level based on the differential comparison.

2. The method of claim 1 wherein the electrical charging output applied to the battery comprises a voltage, and the step of measuring the charge input to the battery at each charging level comprises measuring a current flow.

3. The method of claim 2 wherein the step of adjusting the base charging level based on the differential comparison comprises the step of increasing the base voltage a selected increment amount if the lower differential is greater than the upper differential by a selected amount, or decreasing the base voltage a selected decrement amount if the lower differential is less than the upper differential by a selected amount.

4. The method of claim 2 wherein the step of adjusting the charging output includes the step of increasing the applied voltage a selected step amount to a plurality of levels that provide the lower pair and the upper pair of spaced-apart charging levels.

5. The method of claim 4 further comprising the step of decreasing the applied voltage a selected amount before the step of increasing the voltage to the plurality of levels.

6. The method of claim 2 wherein the step of adjusting the charging output includes the step of decreasing the applied voltage a selected step amount to a plurality of levels that provide the upper pair and the lower pair of spaced-apart charging levels.

7. The method of claim 6 further comprising the step of increasing the applied voltage a selected amount before the step of decreasing the voltage to the plurality of levels.

8. The method of claim 1 wherein the charging output is adjusted such than one of the charging levels of the upper pair of spaced-apart charging levels is common to one of the charging levels of the lower pair.

9. The method of claim 1 wherein the step of measuring the charge input to the battery at each charging level further comprises the step of delaying an amount of time before measuring the charge input to the battery, wherein each charging level measured has a delay time corresponding thereto.

10. The method of claim 1 further comprising the steps of determining whether the battery has achieved a desired amount of charge, and terminating the application of the electrical charging output when the battery has achieved the desired amount.

11. The method of claim 10 further comprising the step of entering a maintenance mode when the battery has achieved the desired amount of charge.

12. The method of claim 11 wherein the step of entering a maintenance mode comprises the step of controlling the power supply to apply a predetermined output level to charging terminals of the battery.

13. The method of claim 11 further comprising the step of connecting a resistive load across the charging terminals of the battery.

14. The method of claim 1 further comprising the steps of determining whether the battery has achieved a desired amount of charge, and providing an increased output charging level to the battery for a period of time to condition the battery including destratifying the battery electrolyte when the desired amount has been achieved.

15. The method of claim 1 wherein the electrical charging output applied to the battery comprises a current, and the step of measuring the charge input to the battery at each charging level comprises measuring a voltage.

16. The method of claim 15 wherein the step of adjusting the base charging level based on the differential comparison comprises the step of increasing the base current a selected increment amount if the lower differential is less than the upper differential by a selected amount, or decreasing the base current a selected decrement amount if the lower differential is greater than the upper differential by a selected amount.

17. The method of claim 1 wherein the steps of applying an electrical charging output, adjusting the charging output to provide upper and lower pairs, measuring the charge input at each of the charging levels, calculating a lower differential and an upper differential, comparing the lower differential and the upper differential and adjusting the base charging level based on the differential comparison are continually repeated.

18. The method of claim 1 wherein the steps of applying an electrical charging output, adjusting the charging output to provide upper and lower pairs, measuring the charge input at each of the charging levels, calculating a lower differential and an upper differential, comparing the lower differential and the upper differential and adjusting the base charging level based on the differential comparison are repeated after a delay time.

19. An apparatus for charging a battery, comprising:
a controllable power source providing an electrical charging output at variable current or voltage levels;
means for connecting the power source to charging terminals of the battery;
control circuitry for controlling the power source to apply the electrical charging output to the battery at a plurality of levels with respect to a base charging level, including charging output levels comprising an upper pair and a lower pair of spaced-apart charging levels;
a sensor for measuring charging input to the battery at each charging level comprising one of said pairs and providing charging input values corresponding thereto;
arithmetic means for calculating a lower differential from the difference in the charge inputs at the two charging levels comprising the lower pair of charging levels, and for calculating an upper differential from the difference in the charge inputs at the two charging levels comprising the upper pair of charging levels; and comparison circuitry for comparing the lower and upper differentials with one another and providing a comparison result, the comparison circuitry being operatively connected to provide the comparison result to the control circuitry, the control circuitry increasing or decreasing the base charging level in dependence on the comparison result.

20. The apparatus of claim 19 wherein the control circuitry controls the power source to apply a voltage to the battery, whereby the base charging level is a base voltage level, and the sensor comprises a current sensor for measuring current levels indicative of the charging input to the battery at each charging level comprising one of said pairs.

21. The apparatus of claim 20 wherein the control circuitry increases the base voltage level a selected increment amount if the lower current differential is greater than the upper current differential by a selected amount, and decreases the base voltage level a selected decrement amount if the lower current differential is less than the upper current differential by a selected amount.

22. The apparatus of claim 19 further comprising means for selectively connecting a resistor across the charging terminals of the battery.

23. The apparatus of claim 19 wherein the control circuitry, arithmetic means and comparison circuitry include a microprocessor, and wherein the sensor includes an analog-to-digital voltage converter.

24. The apparatus of claim 19 further including timing circuitry for delaying a selected amount of time before the sensor measures the charge input to the battery, each charging output level comprising one of said pairs having a delay time corresponding thereto.

25. The apparatus of claim 24 wherein the charging output levels stabilize with time, and wherein the delay times provided by the timing circuitry influence the charging input levels measured by the sensor.

26. The apparatus of claim 19 wherein the control circuitry controls the charging output such that one of the charging levels of the upper pair of spaced-apart charging levels is common to one of the charging levels of the lower pair.

27. The apparatus of claim 19 wherein the control circuitry controls the power source to apply voltage to the battery in increasing voltage levels over time to provide the lower and upper pairs of spaced-apart charging levels.

28. The apparatus of claim 27 wherein the control circuitry controls the power source such that the voltage is increased in discrete steps.

29. The apparatus of claim 27 wherein the control circuitry controls the power source to apply voltage to the battery at a lowered level for a period of time before applying voltage to the battery in increasing voltage levels over time.

30. The apparatus of claim 19 wherein the control circuitry controls the power source to apply voltage to the battery in decreasing levels over time to provide the upper and lower pairs of spaced-apart charging levels.

31. The apparatus of claim 30 wherein the control circuitry controls the power source such that the voltage is decreased in discrete steps.

32. The apparatus of claim 30 wherein the control circuitry controls the power source to apply voltage to the battery a an increased level for a period of time before decreasing the levels to the upper and lower pairs of spaced-apart charging levels.

33. The apparatus of claim 19 further comprising means for determining when the battery has achieved a desired level of charge.

34. The apparatus of claim 33 wherein the means for determining when the battery has achieved a desired level of charge includes means for detecting a substantially constant average charge input to the battery.

35. The apparatus of claim 33 further comprising means for providing an increased output charging level to the battery for a period of time to condition the battery after the battery has achieved a desired level of charge.

36. A method of charging a battery, comprising the steps of:

outputting a charging voltage to the battery in dependence on a base voltage level;

adjusting the charging voltage in steps of predetermined magnitudes to provide first, second and third voltage levels, wherein the first level is less than the second level and the second level is less than the third level;

measuring first, second and third currents at the first, second and third voltage levels, respectively;

calculating a first differential from the difference in the first current from the second current, and calculating a second differential from the difference in the second current from the third current;

comparing the first differential and the second differential; and increasing the base voltage a selected increment amount if the first differential is greater than the second differential, or decreasing the base voltage a selected decrement amount if the first differential is less than the second differential.

37. The method of claim 36 wherein the step of adjusting the charging voltage to the first, second and third levels includes the step of successively increasing the charging voltage from the first level to the second level to the third level.

38. The method of claim 37 further comprising the steps of adjusting the charging voltage to a lowered level that is less than the first voltage level, and increasing the charging voltage from the lowered level to the first level.

39. The method of claim 36 wherein the steps of outputting a charging voltage, adjusting the charging voltage in steps, measuring first, second and third currents, calculating a first differential and a second differential, comparing the first differential and the second differential, and increasing the base voltage a selected increment amount if the first differential is greater than the second differential, or decreasing the base voltage a selected decrement amount if the first differential is less than the second differential, are continually repeated.

40. The method of claim 36 wherein the steps of outputting a charging voltage, adjusting the charging voltage in steps, measuring first, second and third currents, calculating a first differential and a second differential, comparing the first differential and the second differential, and increasing the base voltage a selected increment amount if the first differential is greater than the second differential, or decreasing the base voltage a selected decrement amount if the first differential is less than the second differential, are repeated after a delay time.

41. An apparatus for charging a battery, comprising:

a controllable power source providing an electrical charging output at variable current or voltage levels;

means for connecting the power source to charging terminals of the battery;

control circuitry for controlling the power source to periodically apply the electrical charging output to the battery at first, second, third and fourth output levels with respect to a base charging level;

a sensor for measuring charging input to the battery at the first, second, third and fourth output levels and providing first, second, third and fourth charging input values corresponding thereto;

means for receiving the first, second, third and fourth input values from the sensor and for determining a differential between the first and second charging input values and a differential between the third and fourth charging input values; and comparison circuitry for comparing the differentials and providing a comparison result, the comparison circuitry further being operatively connected to the control circuitry to increase or decrease the base charging level in accordance with the comparison result.

42. The apparatus of claim 41 wherein the charging outputs are voltages and the input values are currents, and wherein the fourth charging voltage level is greater than the first charging voltage level, and the control circuitry increases the base charging level a selected increment amount if the differential between the first and second current input values is greater than the differential between the third and fourth current input values.

43. The apparatus of claim 41 wherein the control means controls the power supply to apply the electrical charging output such that the second output level equals the third output level.

44. A method of charging a battery, comprising the steps of:

a) applying an electrical charging output to the battery in dependence on a base charging level, b) adjusting the charging output to provide an upper pair and a lower pair of spaced-apart charging levels, c) measuring charge input to the battery at each charging level comprising one of said pairs, d) calculating a lower differential from the difference in the charge inputs at the two charging levels comprising the lower pair of charging levels and calculating an upper differential from the difference in the charge inputs at the two charging levels comprising the upper pair of charging levels, e) comparing the lower differential and the upper differential, f) adjusting the base charging level based on the differential comparison, and g) periodically repeating the steps a)–f), thereby repeatedly adjusting the base charging level to provide a more optimal battery charging profile.

45. The method of claim 44 further comprising the step of delaying for a delay time before performing step g.

* * * * *

UNITED STATES PATENT AND TRADEMARK OFFICE
CERTIFICATE OF CORRECTION

PATENT NO. : 5,589,757
DATED : December 31, 1996
INVENTOR(S) : Klang

It is certified that error appears in the above-identified patent and that said Letters Patent is hereby corrected as shown below:

Col. 6, l. 60, "analog-no-digital voltage" should read --analog-to-digital--.
Col. 9, l. 67, "V$_2$ and V" should read --V$_2$ and V$_1$--.
Col. 14, l. 4, "tile" should read --the--.
Col. 16, l. 10, "amount of he" should read --amount of the--.
Col. 17, ll. 43-44, "How-ever, he system" should read --How-ever the system--.
Col. 18, ll. 34-35, "current Output" should read --current output--.
Col. 20, l. 57, "such than" should read --such that--.
Col. 22, l. 62, "battery a" should read --battery at--.
Col. 24, l. 42, "c) measuring" should read --c) measuring a--.

Signed and Sealed this

First Day of April, 1997

BRUCE LEHMAN

Attest:

Attesting Officer

Commissioner of Patents and Trademarks